(12) United States Patent
Otsuki et al.

(10) Patent No.: US 11,768,429 B2
(45) Date of Patent: Sep. 26, 2023

(54) PROJECTION APPARATUS

(71) Applicant: SEIKO EPSON CORPORATION, Tokyo (JP)

(72) Inventors: Nobuyuki Otsuki, Matsumoto (JP); Makoto Zakoji, Matsumoto (JP); Katsunori Tanaka, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/502,420

(22) Filed: Oct. 15, 2021

(65) Prior Publication Data

US 2022/0121096 A1 Apr. 21, 2022

(30) Foreign Application Priority Data

Oct. 16, 2020 (JP) ................................. 2020-174988

(51) Int. Cl.
G03B 21/14 (2006.01)
H04N 9/31 (2006.01)
G03B 21/20 (2006.01)
G02B 27/10 (2006.01)
G03B 21/16 (2006.01)

(52) U.S. Cl.
CPC ..... *G03B 21/2066* (2013.01); *G02B 27/1006* (2013.01); *G03B 21/16* (2013.01); *G03B 21/204* (2013.01); *G03B 21/2013* (2013.01); *H04N 9/3161* (2013.01); *H04N 9/3164* (2013.01)

(58) Field of Classification Search
CPC ...... G03B 21/145; G03B 21/28; G03B 21/14; H04N 9/3141
See application file for complete search history.

(56) References Cited

U.S. PATENT DOCUMENTS

2011/0211242 A1 9/2011 Nakamura
2014/0293232 A1 10/2014 Tanaka

FOREIGN PATENT DOCUMENTS

| JP | 2003-207740 A | 7/2003 |
| JP | 2009-037172 A | 2/2009 |
| JP | 2011-75898 | 4/2011 |
| JP | 2012-037724 A | 2/2012 |
| JP | 2013-8044 | 1/2013 |
| JP | 2014-209184 A | 11/2014 |
| JP | 2020-024318 A | 2/2020 |

*Primary Examiner* — Ryan D Howard
(74) *Attorney, Agent, or Firm* — Dority & Manning, P.A.

(57) ABSTRACT

A projection apparatus includes a light source apparatus, a first reflective optical element that reflects the light outputted by the light source apparatus, a second reflective optical element that reflects the light reflected off the first reflective optical element, and a projection optical apparatus that enters the light from the second reflective optical element. The projection optical apparatus has an entrance optical path, a deflection member that deflects the direction of the light traveling along the entrance optical path, and a passage optical path along which the light that exits out of the deflection member travels. The extension of the light exiting optical axis of the light source apparatus does not coincide with the extension of the optical axis of the entrance optical path and intersects with the extension containing the optical axis of the passage optical path.

18 Claims, 15 Drawing Sheets

FIG. 2
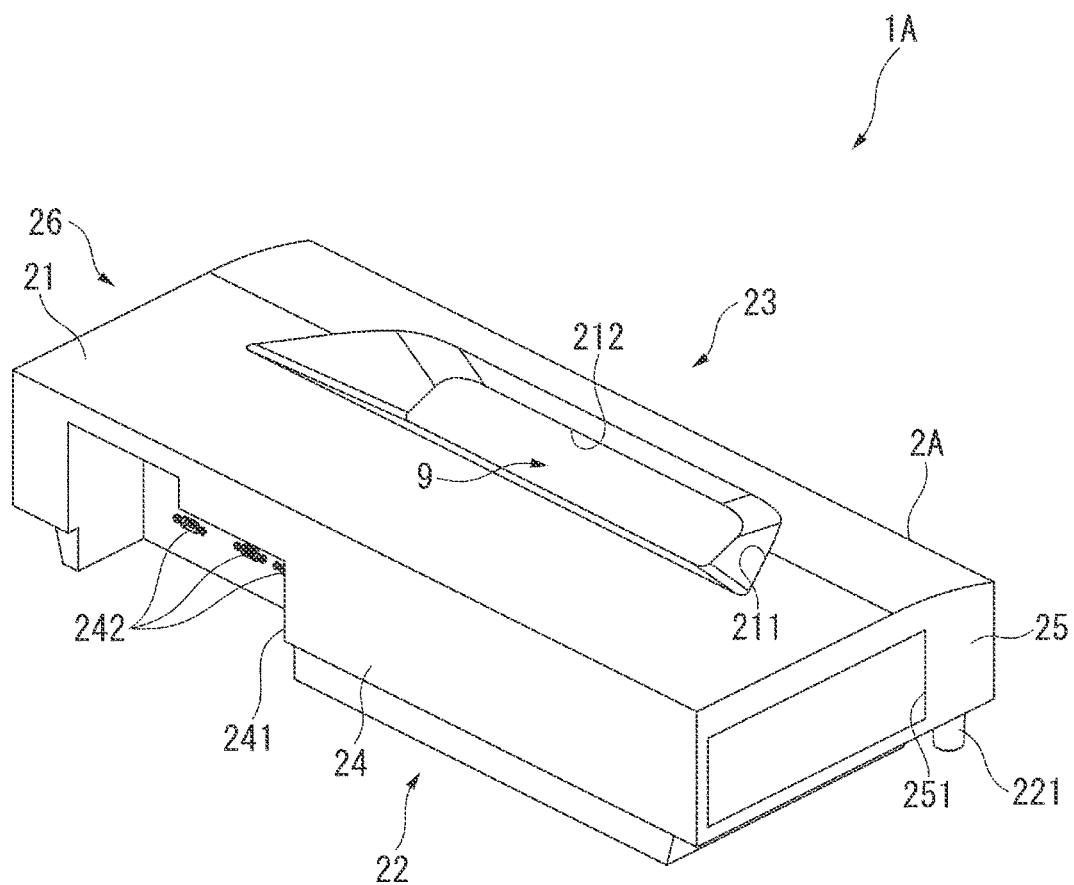
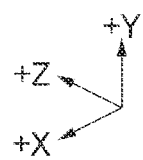

PROJECTION APPARATUS

The present application is based on, and claims priority from JP Application Serial Number 2020-174988, filed Oct. 16, 2020, the disclosure of which is hereby incorporated by reference herein in its entirety

BACKGROUND

1. Technical Field

The present disclosure relates to a projection apparatus.

2. Related Art

There has been a known projector including a light source, a light modulation apparatus that modulates the light outputted from the light source, and a projection optical apparatus that projects the light modulated by the light modulation apparatus (see JP-A-2013-8044 and JP-A-2011-75898, for example).

In the projector (projection-type display apparatus) described in JP-A-2013-8044, the reflection mirror changes the traveling direction of the light outputted from the light source by about 90°, and the video display device is then irradiated with the light reflected off the reflection mirror. The optical image modulated by the video display device enters the reflective optical system via the transmissive optical system including the front lens group and the rear lens group and is reflected off the reflective optical system to form an image on the table.

In the projection-type display apparatus described as another example in JP-A-2013-8044, the video display device is irradiated with the light outputted from the light source. The optical image modulated by the video display device is incident on the deflection mirror via the front lens group. After the traveling direction of the optical image is changed by the deflection mirror by 90°, the optical image is incident on the reflective optical system via the rear lens group and reflected off the reflective optical system.

In the projector described in JP-A-2011-75898, the light from the light source unit is incident on the display device via the light guiding optical system. The display device is provided on the light incident side of the projection-side optical system, and an image outputted from the display device is projected onto the screen via the projection-side optical system.

In the one projection-type display apparatus described in JP-A-2013-8044, the video display device is provided on the light incident side of the transmissive optical system. In the projector described in JP-A-2011-75898, the display device is provided on the light incident side of the projection-side optical system. In the configurations described above, the dimension of the projector along the depth direction, that is, in the direction in which the projector projects an image, tends to increase.

On the other hand, in the other projection-type display apparatus described in JP-A-2013-8044, the transmissive optical system is so disposed that the optical axis of the front lens group intersects with the optical axis of the rear lens group. When a large light source having a large dimension in the depth direction is employed, however, the dimension of the projector in the depth direction tends to increase.

There has therefore been a demand for a projection apparatus having a configuration that allows reduction in the size of the projection apparatus.

SUMMARY

A projection apparatus according to an aspect of the present disclosure includes a light source apparatus that outputs light via an exit port, a first reflective optical element that reflects at least part of the light outputted by the light source apparatus, a second reflective optical element disposed in an optical path of the light reflected off the first reflective optical element, and a projection optical apparatus disposed in an optical axis of light that exits out of the second reflective optical element. The projection optical apparatus has an entrance optical path that the light that exits out of the second reflective optical element enters, a deflection member that deflects a direction of the light traveling along the entrance optical path, and a passage optical path along which the light that exits out of the deflection member travels. An extension of a light exiting optical axis of the light source apparatus does not coincide with an extension of an optical axis of the entrance optical path and intersects with an extension containing an optical axis of the passage optical path.

BRIEF DESCRIPTION OF THE DRAWINGS

FIG. 2 is another perspective view showing the exterior appearance of the projector according to the first embodiment.

DESCRIPTION OF EXEMPLARY EMBODIMENTS

First Embodiment

A first embodiment of the present disclosure will be described below with reference to the drawings.

Schematic Configuration of Projector

Figure 1:
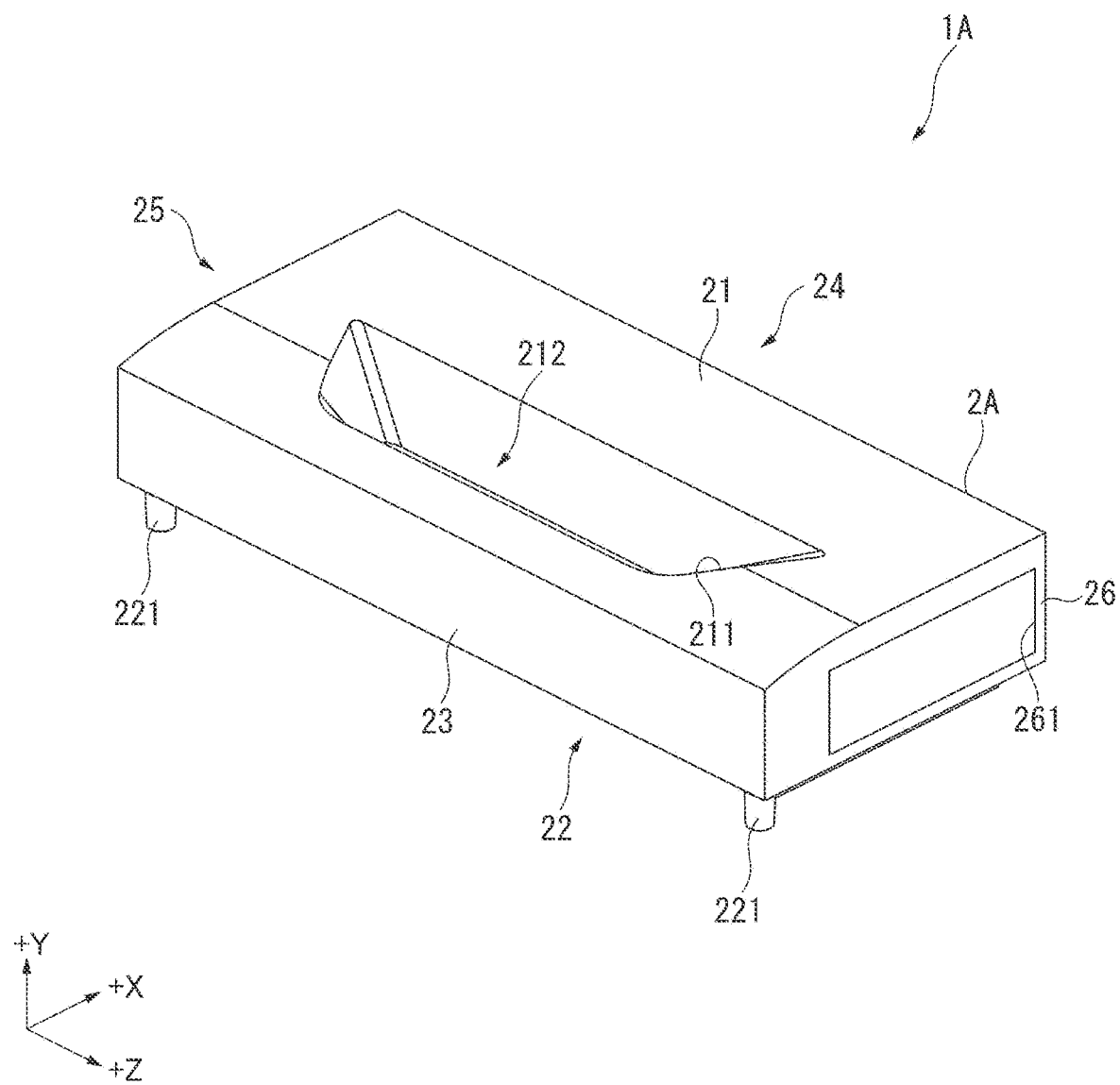
FIG. 1 is a perspective view showing the exterior appearance of a projector according to a first embodiment.

FIGS. 1 and 2 are perspective views showing the exterior appearance of a projector 1A according to the present embodiment. FIG. 1 is a perspective view of the projector 1A viewed from the front side, and FIG. 2 is a perspective view of the projector 1A viewed from the rear side.

The projector 1A according to the present embodiment is a projection apparatus that modulates the light outputted from a light source to generate an image according to image information and projects the generated image on a projection receiving surface, such as a screen. The projector 1A includes an exterior enclosure 2A, as shown in FIGS. 1 and 2.

Configuration of Exterior Enclosure

The exterior enclosure 2A forms the exterior of the projector 1A and accommodates a controller 3, a power supply 4, a cooler 5A, an image projection apparatus 6, and other components that will be described later. The exterior enclosure 2A is formed in a substantially box-like shape and has a top surface 21, a bottom surface 22, a front surface 23, a rear surface 24, a left side surface 25, and a right side surface 26.

The top surface 21 has a recess 211 recessed toward the bottom surface 22 and a passage port 212 provided at the bottom of the recess 211. An image projected from a projection optical apparatus 9, which will be described later, passes through the passage port 211.

A plurality of legs 221, which are in contact an installation surface, are provided at the bottom surface 22.

The right side surface 26 has an opening 261, as shown in FIG. 1. In the present embodiment, the opening 261 functions as an introduction port via which gases outside the exterior enclosure 2A are introduced as a cooling gas into the exterior enclosure 2A.

The rear surface 24 has a recess 241 recessed toward the front surface 23 and a plurality of terminals 242 provided at the bottom of the recess 241, as shown in FIG. 2.

The left side surface 25 has an opening 251. In the present embodiment, the opening 251 functions as a discharge port via which the cooling gas having cooled cooling targets in the exterior enclosure 2A is discharged.

In the following description, three directions perpendicular to one another are called directions +X, +Y, and +Z. The direction +X is the direction from the front surface 23 toward the rear surface 24, the direction +Y is the direction from the bottom surface 22 toward the top surface 21, and the direction +Z is the direction from the left side surface 25 toward the right side surface 26. Although not shown, the direction opposite to the direction +X is a direction −X, the direction opposite to the direction +Y is a direction −Y, and the direction opposite to the direction +Z is a direction −Z.

Figure 3:
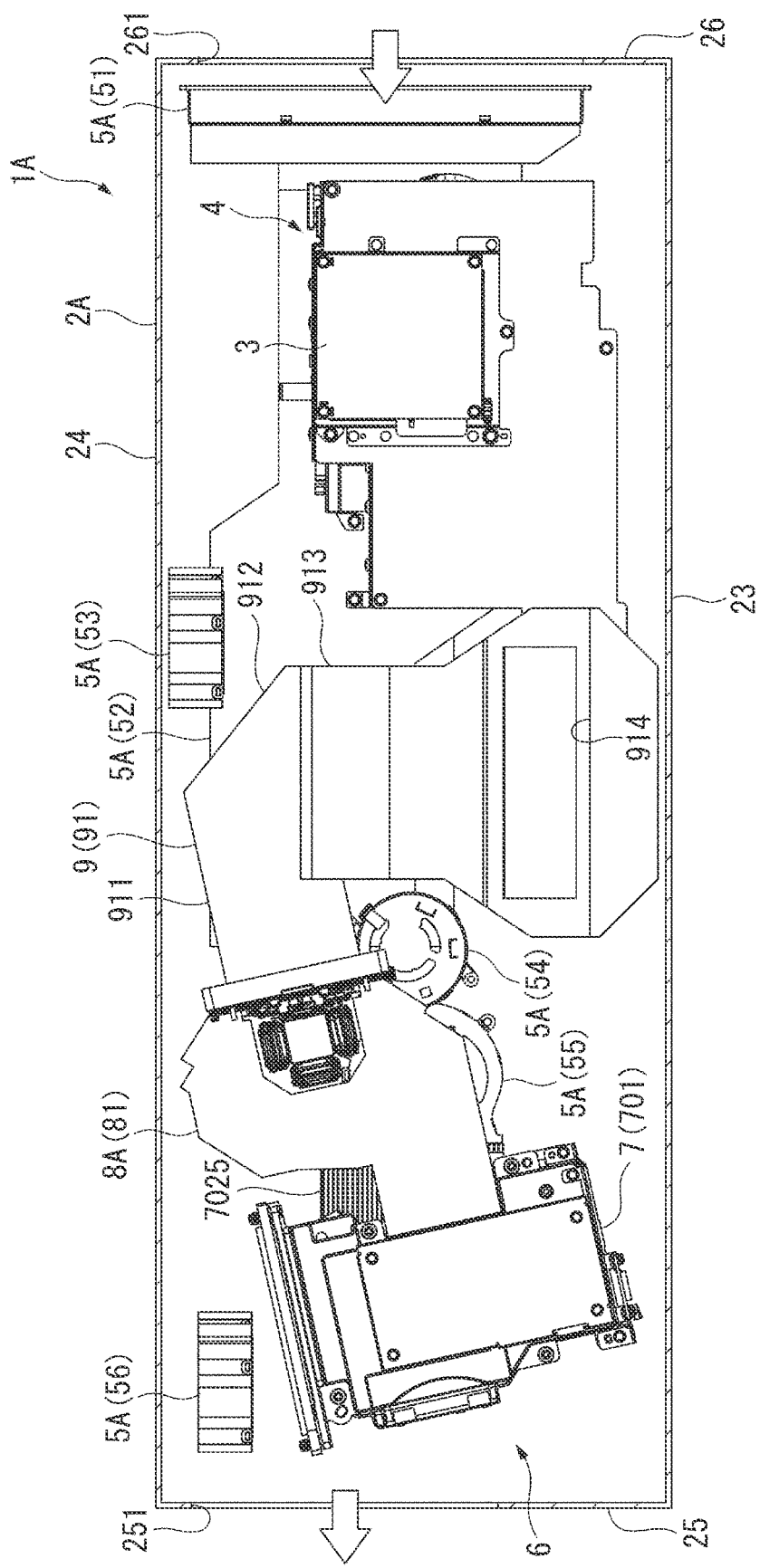
FIG. 3 shows the internal configuration of the projector according to the first embodiment.

FIG. 3 shows the internal configuration of the projector 1A viewed in the direction +Y.

The projector 1A includes the controller 3, the power supply 4, the cooler 5A, and the image projection apparatus 6, which are accommodated in the exterior enclosure 2A, as shown in FIG. 3.

The controller 3 is a circuit substrate provided with a CPU (central processing unit) and other arithmetic processing circuits and controls the operation of the projector 1A.

The power supply 4 supplies electronic parts that form the projector 1A with electric power. In the present embodiment, the power supply 4 transforms externally supplied electric power and supplies the electronic parts with the transformed electric power.

The controller 3 and the power supply 4 are provided in the exterior enclosure 2A and located in a portion shifted in the direction +X from the center of the exterior enclosure 2A. That is, the controller 3 and the power supply 4 are provided on the opposite side of the projection optical apparatus 9, which is located at the center of the exterior enclosure 2A in the direction +Z, from a light source apparatus 7 and an image generation apparatus 8A.

Configuration of Cooler

Figure 4:
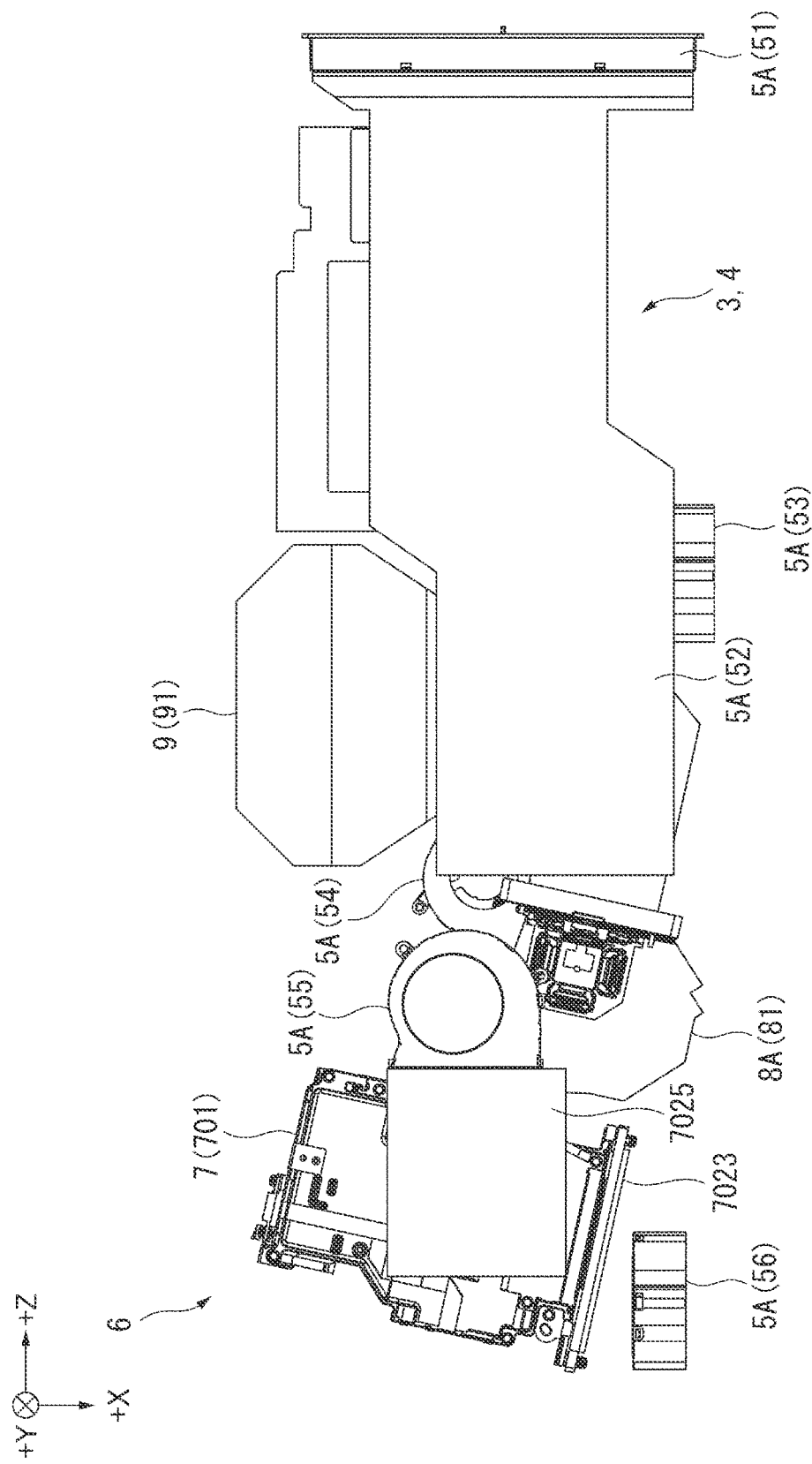
FIG. 4 shows the internal configuration of the projector according to the first embodiment.
Figure 5:
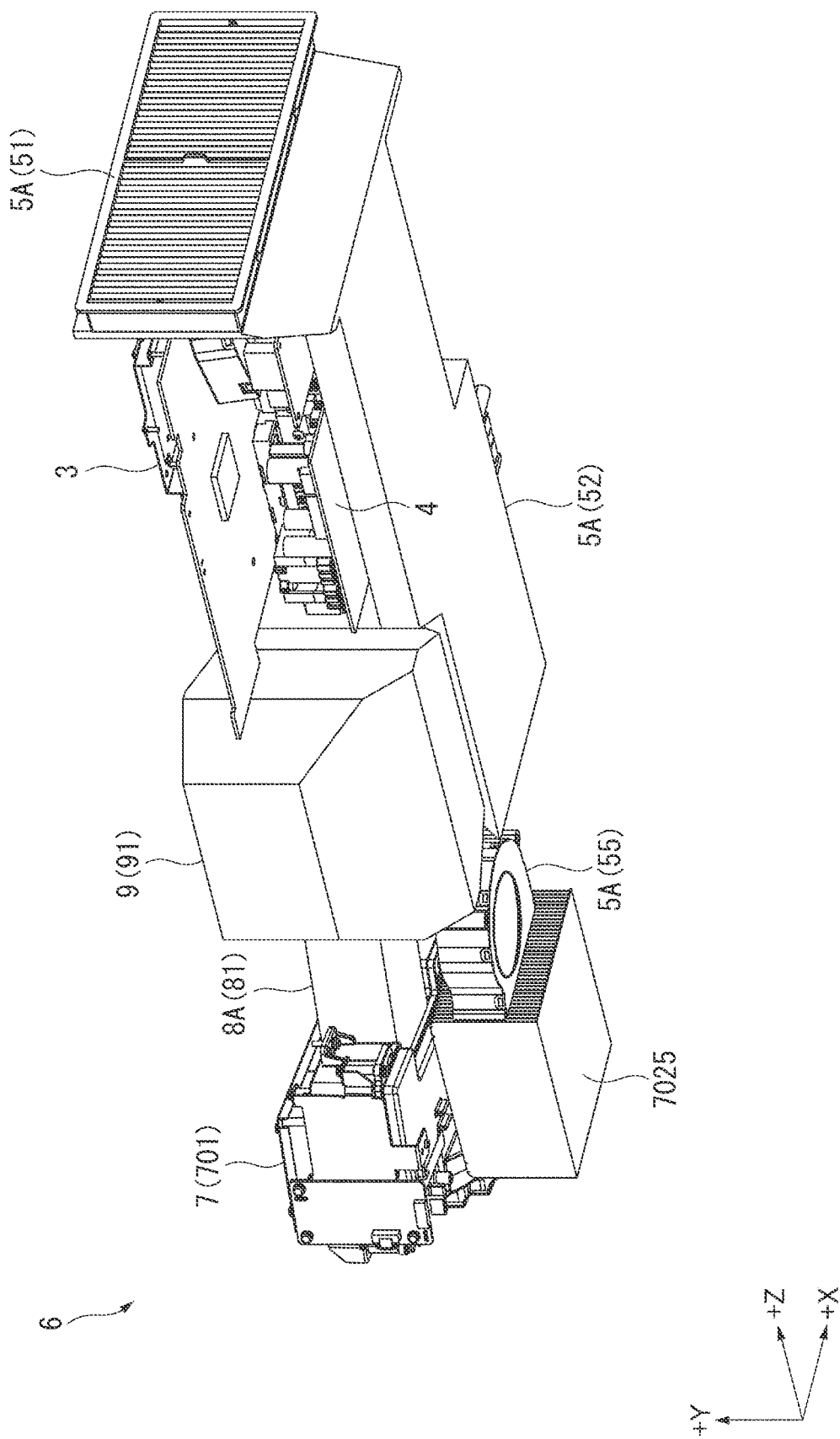
FIG. 5 is a perspective view showing the internal configuration of the projector according to the first embodiment.

FIG. 4 shows the internal configuration of the projector 1A viewed in the direction −Y. FIG. 5 is a perspective view of the internal configuration of the projector 1A viewed in the directions −X and −Y.

The cooler 5A cools cooling targets that form the projector 1A. Specifically, the cooler 5A introduces gases outside the exterior enclosure 2A as the cooling gas into the exterior enclosure 2A and sends the introduced cooling gas to the cooling targets to cool the cooling targets. The cooler 5A includes a filter 51, a duct 52, and fans 53 to 56, as shown in FIGS. 3 to 5.

The filter 51 is fitted to the opening 261 in an attachable and detachable manner. The filter 51 removes dust contained in the gases introduced as the cooling gas into the exterior enclosure 2A via the opening 261.

The duct 52 extends from a portion shifted in the direction +Z in the exterior enclosure 2A in the direction −Z beyond the center of the exterior enclosure 2A in the direction +Z. One end of the duct 52 is coupled to the filter 51 provided in the opening 261, and the other end of the duct 52 is located in a position shifted in the direction −Z from the center of the exterior enclosure 2A in the direction +Z. Key parts of the duct 52 are disposed in positions shifted in the direction −Y from the controller 3, the power supply 4, and the projection optical apparatus 9. The duct 52 guides part of the cooling gas having passed through the filter 51 into the space shifted in the direction −Z from the projection optical apparatus 9. The key parts of the duct 52 may instead be disposed in positions shifted in the direction +Y from the controller 3, the power supply 4, and the projection optical apparatus 9.

The fan 53 is disposed in the exterior enclosure 2A in a position substantially at the center in the direction +Z but shifted in the direction +X. The fan 53 sends in the direction −Z the cooling gas having passed through the filter 51 and flowed via the controller 3 and the power supply 4. The thus flowing cooling gas cools the controller 3 and the power supply 4.

The fans 54 and 55 are disposed in the space surrounded by the image projection apparatus 6 in the exterior enclosure 2A. Specifically, the fans 54 and 55 are disposed in positions sandwiched between the light source apparatus 7 and the projection optical apparatus 9, which form the image projection apparatus 6, in the direction +Z and shifted in the direction −X from the image generation apparatus 8A. That is, the fans 54 and 55 are provided in the space between the light source apparatus 7 and the projection optical apparatus 9, which form the image projection apparatus 6, and on the opposite side of the extension of the light exiting optical axis of the light source apparatus 7, which will be described later, from the light incident optical axis of the projection optical apparatus 9, which will be described later.

The fan 54 sucks part of the cooling gas having flowed in the direction −X through the duct 52 and sends the sucked cooling gas to a light modulation apparatus 85, which will be described later, in the image generation apparatus 8A to cool the light modulation apparatus 85.

The fan 55 sucks the other part of the cooling gas having flowed in the direction −X through the duct 52 and sends the sucked cooling gas to a heat dissipating member 7025 of the light source apparatus 7 to cool the heat dissipating member 7025.

The fan 56 is disposed in the vicinity of the opening 251 in the exterior enclosure 2A. The fan 56 sucks the cooling gas having cooled the cooling targets and discharges the cooling gas out of the exterior enclosure 2A via the opening 251.

Configuration of Image Projection Apparatus

Figure 6:
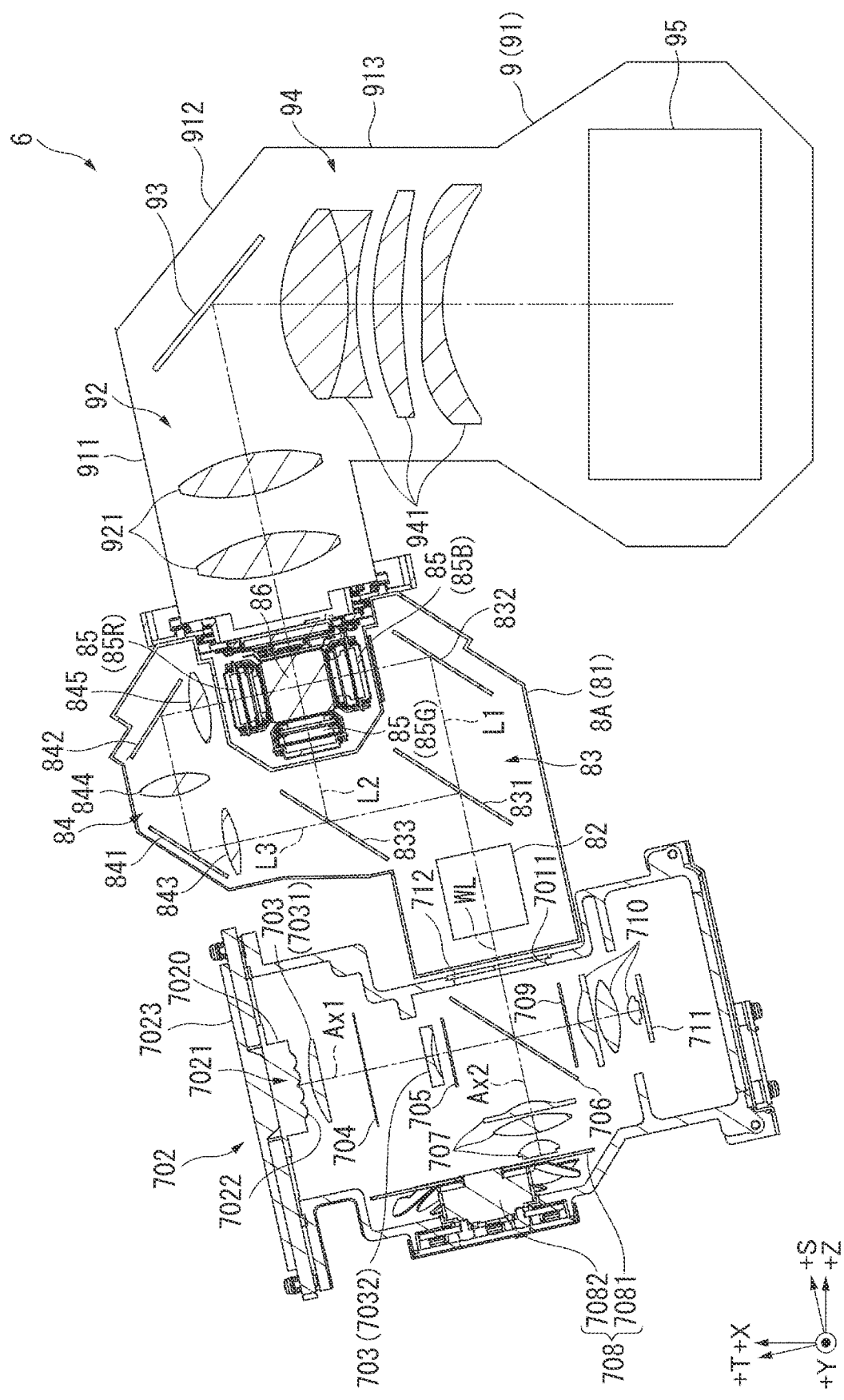
FIG. 6 is a diagrammatic view showing the configuration of an image projection apparatus according to the first embodiment.

FIG. 6 is a diagrammatic view showing the configuration of the image projection apparatus 6.

The image projection apparatus 6 generates an image according to an image signal inputted from the controller 3 and projects the generated image. The image projection apparatus 6 includes the light source apparatus 7, the image generation apparatus 8A, and the projection optical apparatus 9, as shown in FIGS. 3 and 6.

Configuration of Projection Optical Apparatus

The configuration of the projection optical apparatus 9 will first be described.

The projection optical apparatus 9 projects the image light generated by the image generation apparatus 8A onto the projection receiving surface described above. That is, the projection optical apparatus 9 projects the light modulated by the light modulation apparatus 85, which forms the image generation apparatus 8A. The projection optical apparatus 9 includes a lens enclosure 91, an entrance optical path 92, a deflection member 93, a passage optical path 94, and an optical path changing member 95, as shown in FIG. 6.

The lens enclosure 91 is configured to have an inverted L-like shape when the lens enclosure 91 is so viewed in the direction +Y that the direction +X is oriented upward. The lens enclosure 91 includes an entrance section 911, a deflection section 912, and an exit section 913.

The entrance section 911 forms the entrance optical path 92.

The deflection section 912 is a portion that couples the entrance section 911 to the exit section 913 and deflects in the direction −X the direction in which the image light travels along the entrance optical path 92 in the entrance section 911. The deflection member 93 is provided in the deflection section 912.

The exit section 913 is a portion that extends along the direction −X from the deflection section 912, forms the passage optical path 94, and accommodates the optical path changing member 95. An opening 914 (see FIG. 3), via which the image light that travels in the direction converted by the optical path changing member 95 passes, is provided in accordance with the optical path changing member 95 at a +Y-direction-side portion of the exit section 913.

The entrance optical path 92 is an optical path which is provided in the entrance section 911 and along which the image light is incident from the image generation apparatus 8A. A plurality of lenses 921 supported by the entrance section 911 are provided in the entrance optical path 92.

The deflection member 93 deflects at an acute angle and reflects in the direction −X the direction of the image light having traveled along the entrance optical path 92. The deflection member 93 is formed, for example, of a reflection mirror.

The passage optical path 94 is provided in the exit section 913 extending along the direction −X, and the image light from the deflection member 93 passes in the direction −X along the passage optical path 94. A plurality of lenses 941 supported by the exit section 913 are present in the passage optical path 94.

The optical path changing member 95 is provided in a position shifted in the direction −X, which is the direction toward the light exiting side of the passage optical path 94, in the exit section 913. The optical path changing member 95 is an aspheric mirror that reverses the direction of the image light having traveled along the passage optical path 94. The image light reflected off the optical path changing member 95 passes through the opening 914 and diffuses while traveling in the direction +Y as the image light travels in the direction +X, which is the direction opposite to the direction in which the image light travels along the passage optical path 94. A large-screen image can thus be displayed on the projection receiving surface even when the distance between the projector 1A and the projection receiving surface is short. The opposite direction described above includes an obliquely upward projection direction achieved by the aspheric mirror or a projection direction toward the rear surface 24 achieved by two reflection mirrors that deflect the optical path.

The image light outputted from the image generation apparatus 8A enters the entrance section 911 and travels along the entrance optical path 92. That is, the light incident optical axis of the projection optical apparatus 9 coincides with the optical axis of the entrance optical path 92. The optical axis of the entrance optical path 92 inclines with respect to the directions +X and +Z and intersects with the passage optical path 94, which is parallel to the direction −X, at an angle other than 90° at the deflection member 93. In detail, the angle of intersection of the optical axis of the entrance optical path 92 and the optical axis of the passage optical path 94 is an acute angle, for example, about 77.5°.

In the present embodiment, the optical axis of the entrance optical path 92 is parallel to the light exiting optical axis of the light source apparatus 7 and is shifted in the direction +X from the light exiting optical axis of the light source apparatus 7.

In the following description, the direction in which the image light travels along the entrance optical path 92 is a direction +S when viewed in the direction +Y, and the direction perpendicular to the direction +S and extending from the front surface 23 toward the rear surface 24 is a direction +T. The directions +S and +T are each perpendicular to the direction +Y and intersect with the directions +X and +Z. Although not shown, the direction opposite to the direction +S is a direction −S, and the direction opposite to the direction +T is a direction −T.

Configuration of Light Source Apparatus

The light source apparatus 7 is disposed in a position shifted in the direction −Z from the projection optical apparatus 9 and outputs white light WL to the image generation apparatus 8A. The light source apparatus 7 includes a light source enclosure 701 and the following components accommodated in the light source enclosure 701: a light source 702; an afocal optical element 703; a first phase retarder 704; a diffusive transmission element 705; a light combiner 706; a first light collector 707; a wavelength conversion apparatus 708; a second phase retarder 709; a second light collector 710; a diffusive optical element 711; and a third phase retarder 712.

The light source 702, the afocal optical element 703, the first phase retarder 704, the diffusive transmission element 705, the light combiner 706, the second phase retarder 709, the second light collector 710, and the diffusive optical element 711 are arranged along an illumination optical axis Ax1 set in the light source apparatus 7. The illumination optical axis Ax1 is an illumination optical axis parallel to the direction +T.

The wavelength conversion apparatus 708, the first light collector 707, the light combiner 706, and the third phase retarder 712 are arranged along an illumination optical axis Ax2 set in the light source apparatus 7 and perpendicular to the illumination optical axis Ax1. The illumination optical axis Ax2 is an illumination optical axis parallel to the direction +S, and the extension of the illumination optical axis Ax2 coincides with the light exiting optical axis of the light source apparatus 7.

Configuration of Light Source Enclosure

The light source enclosure 701 is an enclosure that dust is unlikely to enter and is formed in a substantially box-like shape having a dimension in the direction +T greater than the dimension in the direction +S. The light source enclosure 701 has an exit port 7011, via which the white light WL exits.

The light source apparatus 7 outputs the white light WL in the direction +S along the light exiting optical axis of the exit port 7011. The light exiting optical axis of the exit port 7011 is the optical axis of the light that exits via the exit port 7011 and is also the light exiting optical axis of the light source apparatus 7. In the present embodiment, the light exiting optical axis of the light source apparatus 7 is parallel to the direction +S and further parallel to the light incident optical axis of the projection optical apparatus 9.

Configuration of Light Source

The light source 702 outputs light in the direction +X. The light source 702 includes a support member 7020, a plurality of solid-state light emitters 7021, and a plurality of collimator lenses 7022.

The support member 7020 supports the plurality of solid-state light emitters 7021 arranged in an array in a plane perpendicular to the illumination optical axis Ax1. The support member 7020 is a member made of metal, and heat of the plurality of solid-state light emitters 7021 is transferred to the support member 7020.

The plurality of solid-state light emitters 7021 are each a light emitter that emits s-polarized blue light. In detail, the solid-state light emitters 7021 are each a semiconductor laser, and the blue light emitted by each of the solid-state light emitters 7021 is, for example, laser light having a peak wavelength of 440 nm. The light exiting optical axes of the plurality of solid-state light emitters 7021 extend along the direction +X, and the solid-state light emitters 7021 each emit the light in the direction +X.

The plurality of collimator lenses 7022 are provided in correspondence with the plurality of solid-state light emitters 7021. The plurality of collimator lenses 7022 convert the blue light emitted from the plurality of solid-state light emitters 7021 into parallelized light fluxes, which enter the afocal optical element 703.

The light source 702 thus outputs linearly polarized blue light having a single polarization direction, but not necessarily. The light source 702 may instead be configured to output s-polarized blue light and p-polarized blue light. In this case, the first phase retarder 704 can be omitted.

Figure 7:
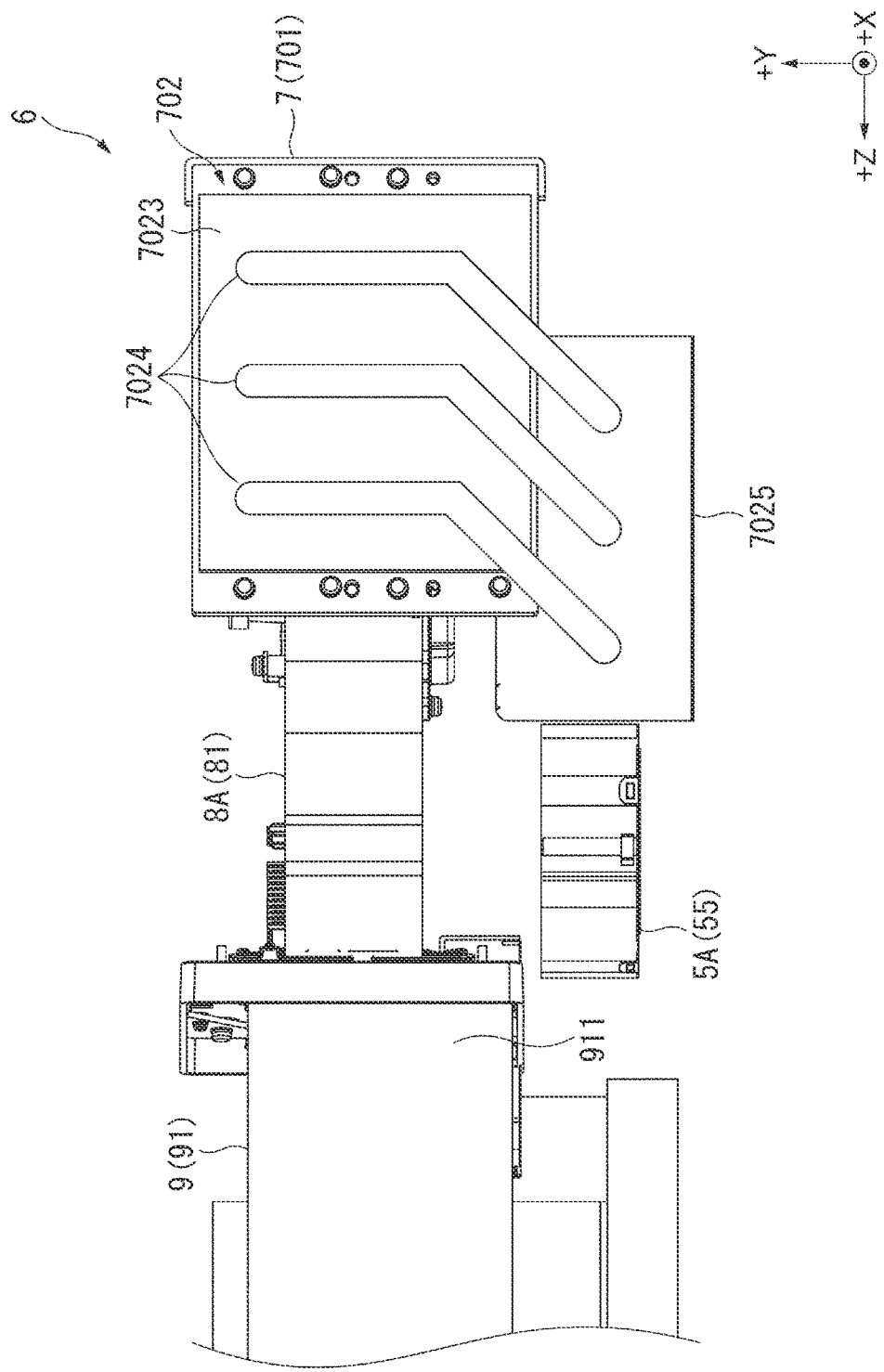
FIG. 7 shows a light source according to the first embodiment.

FIG. 7 is a plan view showing the light source 702 viewed in the direction +X.

In addition to the configuration described above, the light source 702 includes a heat receiving member 7023, heat pipes 7024, and the heat dissipating member 7025, as shown in FIG. 7.

The heat receiving member 7023 is provided on the opposite side of the plurality of solid-state light emitters 7021 from the light emitting side thereof, that is, in a position shifted in the direction +T from the plurality of solid-state light emitters 7021. The heat receiving member 7023 is coupled to the support member 7020 in a heat transferable manner and receives the heat of the plurality of solid-state light emitters 7021 transferred to the support member 7020.

The heat pipes 7024 couple the heat receiving member 7023 to the heat dissipating member 7025 in a heat transferable manner and transfer the heat transferred to the heat receiving member 7023 to the heat dissipating member 7025. The number of heat pipes 7024 is not limited to three and can be changed as appropriate.

The heat dissipating member 7025 is a heat sink with a plurality of fins and is provided in a position shifted in the direction −Y from the light source enclosure 701. The heat dissipating member 7025 dissipates the heat transferred from the heat receiving member 7023 via the heat pipes 7024. The heat dissipating member 7025 is cooled by the cooling gas caused to flow by the fan 55. The plurality of solid-state light emitters 7021 are thus cooled.

Configuration of Afocal Optical Element

The afocal optical element 703 shown in FIG. 6 reduces the diameter of the blue light flux incident from the light source 702. The afocal optical element 703 is formed of a first lens 7031, which focuses the light incident thereon, and a second lens 7032, which parallelizes the light flux focused by the first lens 7031. The afocal optical element 703 may be omitted.

Configuration of First Phase Retarder

The first phase retarder 704 is provided between the first lens 7031 and the second lens 7032. The first phase retarder 704 converts one type of linearly polarized light incident thereon into light containing s-polarized blue light and p-polarized blue light.

A pivot apparatus may cause the first phase retarder 704 to pivot around a pivotal axis extending along the illumination optical axis Ax1. In this case, the ratio between the s-polarized blue light and the p-polarized blue light in the light flux that exits out of the first phase retarder 704 can be adjusted in accordance with the angle of the pivotal movement of the first phase retarder 704.

Configuration of Diffusive Transmission Element

The diffusive transmission element 705 homogenizes the illuminance distribution of the blue light incident from the second lens 7032. The diffusive transmission element 705 can, for example, have a configuration including a hologram, a configuration in which a plurality of lenslets are arranged in a plane perpendicular to the optical axis, or a configuration in which a light passage surface is a rough surface.

The diffusive transmission element 705 may be replaced with a homogenizer optical element including a pair of multi-lenses.

Configuration of Light Combiner

The blue light having passed through the diffusive transmission element 705 is incident on the light combiner 706.

The light combiner 706 outputs a first portion of the light emitted from the plurality of solid-state light emitters 7021 toward a wavelength converter 7081 and a second portion of the light toward the diffusive optical element 711. In detail, the light combiner 706 is a polarizing beam splitter that separates the s-polarized component and the p-polarized component contained in the light incident on the light combiner 706, reflects the s-polarized component, and transmits the p-polarized component. The light combiner 706 further has color separation characteristics that cause the light combiner 706 to transmit light having a predetermined wavelength and longer wavelengths irrespective of the polarization state of the light incident on the light combiner 706, the s-polarized component or the p-polarized component. Therefore, out of the blue light incident from the diffusive transmission element 705, the s-polarized blue light is reflected off the light combiner 706 and enters the first light collector 707, and the p-polarized blue light passes through the light combiner 706 and enters the second phase retarder 709.

The light combiner 706 may instead have the function of a half-silvered mirror that transmits part of the light incident from the diffusive transmission element 705 and reflects the remaining light and the function of a dichroic mirror that reflects the blue light incident from the diffusive optical element 711 and transmits light incident from the wavelength conversion apparatus 708. In this case, the first phase retarder 704 and the second phase retarder 709 can be omitted.

Configuration of First Light Collector

The first light collector 707 causes the blue light reflected off the light combiner 706 to be collected on the wavelength conversion apparatus 708. Further, the first light collector 707 parallelizes the light incident from the wavelength conversion apparatus 708. In the present embodiment, the first light collector 707 is formed of three lenses, but the number of lenses that form the first light collector 707 is not limited to a specific number.

Configuration of Wavelength Conversion Apparatus

The wavelength conversion apparatus 708 converts the wavelength of the light incident thereon. The wavelength conversion apparatus 708 includes the wavelength converter 7081 and a rotator 7082.

Although not illustrated in detail, the wavelength converter 7081 is a phosphor wheel including a substrate and a phosphor layer provided at the light incident surface of the substrate. The phosphor layer contains phosphor particles. The phosphor particles are excited with incident blue light, which is excitation light, and emit fluorescence having wavelengths longer than the wavelength of the incident blue light. The fluorescence is, for example, light having a peak wavelength ranging from 500 to 700 nm and contains green light and red light. That is, the wavelength converter 7081 outputs fluorescence that is converted light having wavelengths longer than the wavelength of the first portion of the blue light emitted by the solid-state light emitters 7021.

The rotator 7082 rotates the wavelength converter 7081 around an axis of rotation extending along the illumination optical axis Ax2. The rotator 7082 can be formed, for example, of a motor.

The thus configured wavelength converter 7081 outputs the fluorescence in the direction +S along the optical axis of the wavelength converter 7081. The optical axis of the wavelength converter 7081 is perpendicular to the optical axes of the solid-state light emitters 7021, which extend along the direction –T, and coincides with the extension of the light exiting optical axis of the light source apparatus 7.

The fluorescence outputted from the wavelength converter 7081 passes through the first light collector 707 and the light combiner 706 along the illumination optical axis Ax2 and enters the third phase retarder 712.

Configuration of Second Phase Retarder and Second Light Collector

The second phase retarder 709 is disposed between the light combiner 706 and the second light collector 710. The second phase retarder 709 converts the p-polarized blue light having passed through the light combiner 706 into circularly polarized blue light.

The second light collector 710 causes the blue light incident from the second phase retarder 709 to be collected on the diffusive optical element 711. Further, the second light collector 710 parallelizes the blue light incident from the diffusive optical element 711. The number of lenses that form the second light collector 710 can be changed as appropriate.

Configuration of Diffusive Optical Element

The diffusive optical element 711 diffusively reflects in the direction +T the second portion of the blue light incident thereon in the direction –T in such a way that the reflected blue light diffuses at an angle of diffusion equal to that of the fluorescence outputted from the wavelength conversion apparatus 708. The diffusive optical element 711 is a reflection member that reflects the blue light incident thereon in the Lambertian reflection scheme.

The optical axis of the diffusive optical element 711 coincides with the optical axis of the entire solid-state light emitters 7021 and is perpendicular to the optical axis of the wavelength converter 7081. The diffusive optical element 711 is disposed in a position shifted in the direction –T from the light exiting optical axis of the light source apparatus 7. That is, the diffusive optical element 711 is disposed on the opposite side of the light exiting optical axis of the light source apparatus 7 from the optical axis of the entrance optical path 92.

The light source apparatus 7 may include a rotator that rotates the diffusive optical element 711 around an axis of rotation parallel to the illumination optical axis Ax1.

The blue light reflected off the diffusive optical element 711 passes through the second light collector 710 along the direction +T and then enters the second phase retarder 709. When reflected off the diffusive optical element 711, the blue light is converted into circularly polarized light having a polarization rotation direction opposite to the polarization rotation direction of the blue light before reflected. The blue light having entered the second phase retarder 709 via the second light collector 710 is therefore converted into s-polarized blue light by the second phase retarder 709. The blue light incident on the light combiner 706 from the second phase retarder 709 is then reflected off the light combiner 706 and enters the third phase retarder 712. That is, the light that exits out of the light combiner 706 and enters the third phase retarder 712 is the white light WL, which is the mixture of the blue light and the fluorescence.

Configuration of Third Phase Retarder

The third phase retarder 712 converts the white light WL incident from the light combiner 706 into light that is the mixture of s-polarized light and p-polarized light. The white light WL having the thus converted polarization state is outputted from the light source apparatus 7 in the direction +S along the light exiting optical axis of the light source apparatus 7 and enters the image generation apparatus 8A.

Configuration of Image Generation Apparatus

The image generation apparatus 8A generates image light from the white light WL incident in the direction +S from the light source apparatus 7 and outputs the generated image light in the direction +S. In detail, the image generation apparatus 8A modulates the light incident from the light source apparatus 7 to generate image light according to an image signal inputted from the controller 3.

The image generation apparatus 8A includes an enclosure 81, a homogenizer 82, a color separation apparatus 83, a relay apparatus 84, the light modulation apparatus 85, and a color combiner 86.

Configurations of Enclosure and Homogenizer

The enclosure 81 accommodates the homogenizer 82, the color separation apparatus 83, and the relay apparatus 84. In the image generation apparatus 8A, an illumination optical axis that is an optical axis used at a design stage is set, and the enclosure 81 holds the homogenizer 82, the color separation apparatus 83, and the relay apparatus 84 along the illumination optical axis. The light modulation apparatus 85 and the color combiner 86 are further disposed in the illumination optical axis.

The homogenizer 82 homogenizes the illuminance of the white light WL incident from the light source apparatus 7 and also aligns the polarization states of the white light WL with one another. The white light WL having illuminance homogenized by the homogenizer 82 travels via the color separation apparatus 83 and the relay apparatus 84 and illuminates a modulation region of the light modulation apparatus 85. Although not illustrated in detail, the homogenizer 82 includes a pair of lens arrays that homogenize the illuminance, a polarization converter that aligns the polarization states with one another, and a superimposing lens that superimposes a plurality of sub-light fluxes into which the pair of lens arrays divide the white light WL with one another in the modulation region. The white light WL having passed through the homogenizer 82 is, for example, s-polarized linearly polarized light.

Configuration of Color Separation Apparatus

The color separation apparatus 83 separates the white light WL incident in the direction +S from the homogenizer 82 into blue light L1, green light L2, and red light L3. The color separation apparatus 83 includes a first color separator 831, a first reflector 832, and a second color separator 833.

The first color separator 831 corresponds to a first reflective optical element and is disposed in a position shifted in the direction +S from the homogenizer 82. The first color separator 831 transmits in the direction +S the blue light L1 contained in the white light WL incident from the homogenizer 82 and reflects the green light L2 and the red light L3 in the direction +T to separate the blue light L1 from the green light L2 and the red light L3. The blue light L1 separated by the first color separator 831 corresponds to first color light.

The first reflector 832 reflects in the direction +T the blue light L1 having passed through the first color separator 831. The blue light L1 reflected off the first reflector 832 enters a blue light modulator 85B. The optical axis of the blue light L1 between the first color separator 831 and the first reflector 832 coincides with the extension of the light exiting optical axis of the light source apparatus 7.

The second color separator 833 corresponds to a second reflective optical element and is disposed in a position shifted in the direction +T from the first color separator 831. The second color separator 833 reflects the green light L2 in the direction +S out of the green light L2 and the red light L3 reflected off the first color separator 831 and transmits the red light L3 in the direction +T to separate the green light L2 and the red light L3 from each other. The green light L2 separated by the second color separator 833 corresponds to second color light, and the red light L3 separated by the second color separator 833 corresponds to third color light.

The green light L2 separated by the second color separator 833 enters a green light modulator 85G. The red light L3 separated by the second color separator 833 enters the relay apparatus 84.

Configuration of Relay Apparatus

The relay apparatus 84 is provided in the optical path of the red light L3, which is longer than the optical paths of the blue light L1 and the green light L2, and suppresses loss of the red light L3. The relay apparatus 84 includes a second reflector 841, a third reflector 842, a light-incident-side lens 843, a relay lens 844, and a light-exiting-side lens 845.

The second reflector 841 reflects in the direction +S the red light L3 having passed through the second color separator 833. The third reflector 842 reflects in the direction −T the red light L3 reflected off the second reflector 841. The light-incident-side lens 843 is disposed between the second color separator 833 and the second reflector 841. The relay lens 844 is disposed between the second reflector 841 and the third reflector 842. The light-exiting-side lens 845 is disposed between the second reflector 841 and a red light modulator 85R.

In the present embodiment, the relay apparatus 84 is provided in the optical path of the red light L3, but not necessarily. For example, the blue light L1 may be set as the color light having a longer optical path than the other color light, and the relay apparatus 84 may be provided in the optical path of the blue light L1.

Configuration of Light Modulation Apparatus

The light modulation apparatus 85 modulates the light incident thereon in accordance with an image signal. The light modulation apparatus 85 includes the blue light modulator 85B as a first light modulator, the green light modulator 85G as a second light modulator, and the red light modulator 85R as a third light modulator.

The blue light modulator 85B modulates the blue light L1 incident in the direction +T from the first reflector 832. The blue light L1 modulated by the blue light modulator 85B travels in the direction +T and enters the color combiner 86.

The green light modulator 85G modulates the green light L2 incident in the direction +S from the second color separator 833. The green light L2 modulated by the green light modulator 85G travels in the direction +S and enters the color combiner 86.

The red light modulator 85R modulates the red light L3 incident in the direction −T via the light-exiting-side lens 845. The red light L3 modulated by the red light modulator 85R travels in the direction −T and enters the color combiner 86.

In the present embodiment, the light modulators 85B, 85G, and 85R each include a transmissive liquid crystal panel and a pair of polarizers that sandwich the transmissive liquid crystal panel.

Configuration of Color Combiner

The color combiner 86 combines the blue light L1 modulated by the blue light modulator 85B, the green light L2 modulated by the green light modulator 85G, and the red light L3 modulated by the red light modulator 85R with one another to generate image light. Specifically, the color combiner 86 reflects in the direction +S the blue light L1 incident from the blue light modulator 85B, transmits in the direction +S the green light L2 incident from the green light modulator 85G, and reflects in the direction +S the red light L3 incident from the red light modulator 85R. The combined image light from the light combiner 86 exits in the direction +S along the light exiting optical axis of the light combiner 86, that is, the light exiting optical axis of the image generation apparatus 8A and enters the entrance optical path 92 of the projection optical apparatus 9. That is, the extension of the optical axis of the green light L2 reflected off the second color separator 833 coincides with the light exiting optical axis of the light combiner 86, and the light exiting optical axis of the light combiner 86 coincides with the light incident optical axis of the projection optical apparatus 9.

In the present embodiment, the color combiner 86 is formed of a cross dichroic prism, but not necessarily. The color combiner 86 can be formed, for example, of a plurality of dichroic mirrors.

The image light outputted from the thus configured image generation apparatus 8A is projected by the projection optical apparatus 9 onto the projection receiving surface as described above.

Position of Each Optical Axis in the Image Projection Apparatus

Figure 8:
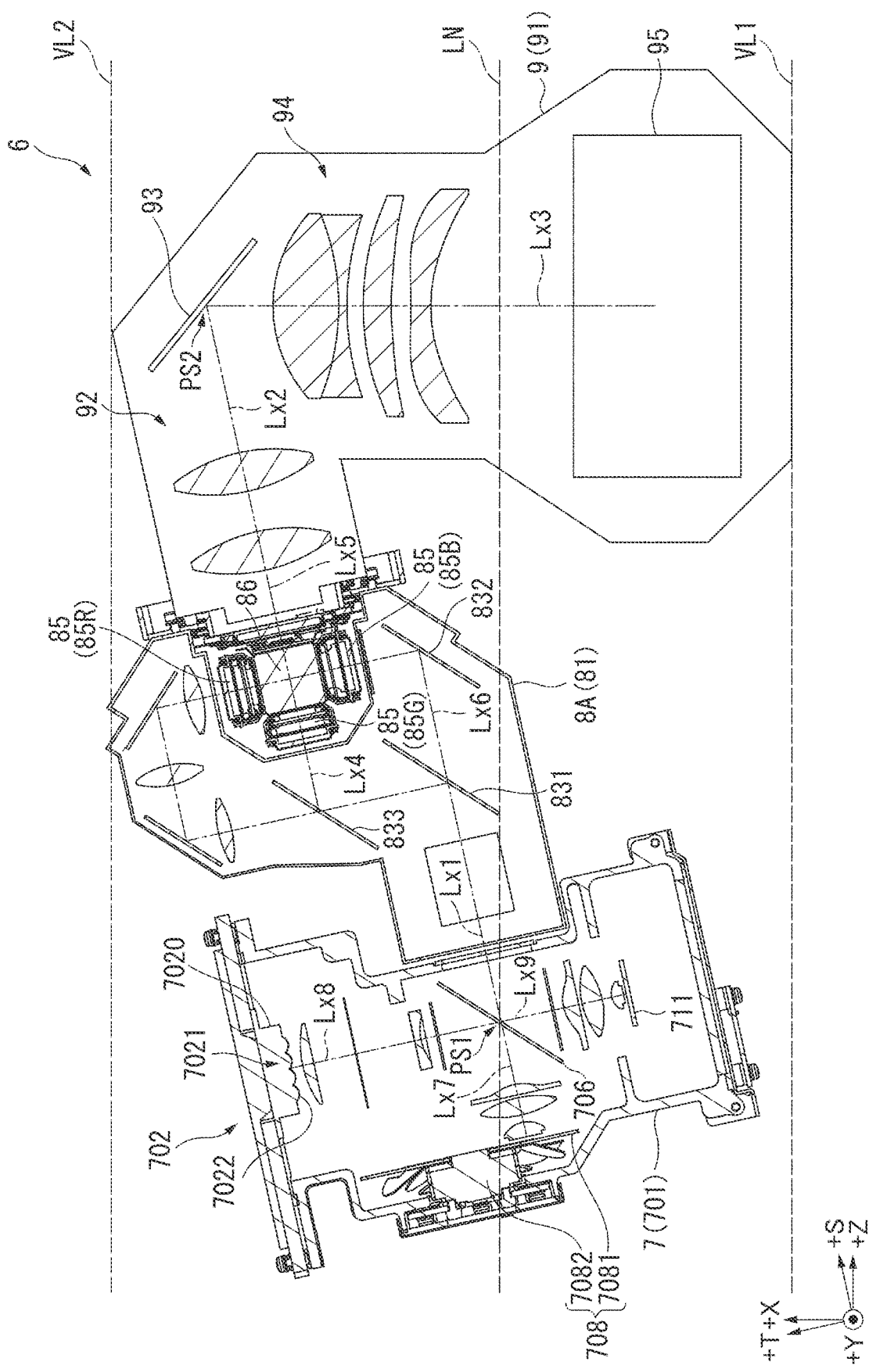
FIG. 8 shows the optical axis of each optical part in the image projection apparatus according to the first embodiment.

FIG. 8 describes the optical axes of the optical parts in the image projection apparatus 6. In FIG. 8, only some of the optical parts that form the image projection apparatus 6 have reference characters for clarity of illustration.

A light exiting optical axis Lx1 of the light source apparatus 7 is parallel to an optical axis Lx2 of the entrance optical path 92, as shown in FIG. 8. On the other hand, the light exiting optical axis Lx1 of the light source apparatus 7 is set so as to be shifted in the direction −T from the optical axis Lx2 of the entrance optical path 92, so that the extension of the light exiting optical axis Lx1 of the light source apparatus 7 does not coincide with the optical axis Lx2 of the entrance optical path 92.

The extension of the light exiting optical axis Lx1 of the light source apparatus 7 intersects with an extension containing an optical axis Lx3 of the passage optical path 94 extending along the direction +X. In the present embodiment, the extension of the light exiting optical axis Lx1 of the light source apparatus 7 is located between the optical path changing member 95 and the deflection member 93 in the direction +X in the projection optical apparatus 9. The extension of the light exiting optical axis Lx1 of the light source apparatus 7 therefore intersects with the optical axis Lx3 of the passage optical path 94 extending along the direction +X. In the present specification, the extension containing the optical axis Lx3 of the passage optical path 94 includes the optical axis Lx3 and the extension of the optical axis Lx3.

In the image generation apparatus 8A, the green light L2 reflected off the second color separator 833 in the direction +S and modulated by the green light modulator 85G passes through the color combiner 86 in the direction +S. An optical axis Lx4 of the green light L2 reflected off the second color separator 833 therefore coincides with an optical axis Lx5 of the image light, which is the combined light as the result of the combination performed by the color combiner 86. That is, the optical axis Lx4 of the green light L2 reflected off the second color separator 833 coincides with the optical axis Lx5 of the image light having exited out of the color combiner 86. The optical axis Lx5 coincides with the optical axis Lx2 of the entrance optical path 92.

The first color separator 831 transmits in the direction +S the blue light L1 contained in the white light WL outputted in the direction +S from the light source apparatus 7, and the blue light L1 having passed through the first color separator 831 is incident on the first reflector 832. The extension of the light exiting optical axis Lx1 of the light source apparatus 7 therefore coincides with an optical axis Lx6 between the first color separator 831 and the first reflector 832.

The light exiting optical axis Lx1 of the light source apparatus 7 coincides with an optical axis Lx7 of the wavelength converter 7081.

The solid-state light emitters 7021 face the diffusive optical element 711. An optical axis Lx8 of the entire solid-state light emitters 7021 and an optical axis Lx9 of the diffusive optical element 711 are perpendicular to the light exiting optical axis Lx1 of the light source apparatus 7.

The optical axis Lx8 of the entire solid-state light emitters 7021, the optical axis Lx7 of the wavelength converter 7081, and the optical axis Lx9 of the diffusive optical element 711 intersect with one another at the light combiner 706. Let PS1 be the position where the optical axes Lx7, Lx8, and Lx9 intersect with one another at the light combiner 706.

The deflection member 93 of the projection optical apparatus 9 deflects at an acute angle the direction of the light having traveled along the entrance optical path 92 to guide the light incident from the entrance optical path 92 to the passage optical path 94. Let PS2 be the position where the light having traveled along the entrance optical path 92 is deflected by the deflection member 93.

When viewed in the direction +Y, a straight line LN passing through the position PS1 and perpendicular to the passage optical path 94 is shifted from the position PS2 in the direction in which the light travels along the passage optical path 94, that is, in the direction −X. The straight line LN is an imaginary straight line.

The aforementioned arrangement of the light source apparatus 7, the image generation apparatus 8A, and the projection optical apparatus 9 can suppress protrusion of the light source apparatus 7 in the direction −X beyond an imaginary line VL1, which is perpendicular to the direction −X and passes through an end of the projection optical apparatus 9 that is the end shifted in the direction −X extending along the optical axis Lx3 of the passage optical path 94, when viewed in the direction +Y. For example, the arrangement described above prevents the diffusive optical element 711 located in a position closest to the negative side of the direction X, out of the solid-state light emitters 7021, the wavelength converter 7081, and the diffusive optical element 711, from being disposed in a position shifted in the direction −X from the imaginary line VL1 when viewed in the direction +Y. The imaginary line VL1 corresponds to a first imaginary line.

The arrangement can also suppress protrusion of the light source apparatus 7 in the direction +X beyond an imaginary line VL2, which is perpendicular to the direction +X and passes through an end of the projection optical apparatus 9 that is the end shifted in the direction +X extending along the optical axis Lx3 of the passage optical path 94, when viewed in the direction +Y. For example, the arrangement described above prevents the solid-state light emitters 7021 located in a position closest to the positive side of the direction X, out of the solid-state light emitters 7021, the wavelength converter 7081, and the diffusive optical element 711, from being disposed in a position shifted in the direction +X from the imaginary line VL2 when viewed in the direction +Y. The imaginary line VL2 corresponds to a second imaginary line.

The dimension of the projector 1A in the direction +X can therefore be reduced as compared with a case where the light source apparatus 7 protrudes in the direction +X or −X beyond the projection optical apparatus 9.

Effects of First Embodiment

The projector 1A according to the present embodiment described above can provide the effects below.

The projector 1A, which is the projection apparatus, includes the light source apparatus 7, the first color separator 831 as the first reflective optical element, the second color separator 833 as the second reflective optical element, and the projection optical apparatus 9.

The light source apparatus 7 outputs the white light WL via the exit port 7011. The first color separator 831 reflects at least part of the white light WL outputted by the light source apparatus 7. Specifically, the first color separator 831 reflects the green light L2 and the red light L3 out of the white light WL outputted by the light source apparatus 7. The second color separator 833 is disposed in the optical path of the light reflected off the first color separator 831 and reflects and outputs the green light L2 incident from the first color separator 831.

The projection optical apparatus 9 is disposed in the optical axis Lx4 of the light having exited out of the second color separator 833. The projection optical apparatus 9 has the entrance optical path 92, the deflection member 93, and the passage optical path 94.

The light having exited out of the second color separator 833 enters the entrance optical path 92. The deflection member 93 deflects the traveling direction of the light having traveled along the entrance optical path 92. The light having exited out of the deflection member 93 travels along the passage optical path 94.

The extension of the light exiting optical axis Lx1 of the light source apparatus 7 does not coincide with the optical axis Lx2 of the entrance optical path 92. Further, the extension of the light exiting optical axis Lx1 of the light source apparatus 7 intersects with the extension containing the optical axis Lx3 of the passage optical path 94. In detail, the extension of the light exiting optical axis Lx1 of the light source apparatus 7 intersects with the optical axis Lx3 of the passage optical path 94.

The aforementioned arrangement of the light source apparatus 7 can suppress at least one of protrusion of the light source apparatus 7 and the image generation apparatus 8A in the direction +X beyond the imaginary line VL1 and protrusion of the light source apparatus 7 and the image generation apparatus 8A in the direction −X beyond the imaginary line VL2 described above. An increase in the dimension of the projector 1A in the direction +X can therefore be suppressed, whereby the size of the projector 1A can be reduced.

In the projector 1A, the deflection member 93 deflects at an acute angle the direction of the light having traveled along the entrance optical path 92.

The configuration described above can suppress an increase in the dimension of the projector 1A in the direction +X as compared with a case where the deflection member 93 deflects the direction of the light having traveled along the entrance optical path 92 in such a way that the traveling direction and the deflection direction form a right or obtuse angle, whereby the size of the projector 1A can be reduced.

In the projector 1A, the extension of the light exiting optical axis Lx1 of the light source apparatus 7 intersects with the optical axis Lx3 of the passage optical path 94.

The configuration described above can suppress at least one of protrusion of the light source apparatus 7 in the direction −X beyond the imaginary line VL1 and protrusion of the light source apparatus 7 in the direction +X beyond the imaginary line VL2. The optical parts of the image generation apparatus 8A, including the first color separator 831 and the second color separator 833, can thus be readily disposed between the virtual line VL1 and the virtual line VL2. The size of the projector 1A in the direction +X can therefore be reduced.

In the projector 1A, the light exiting optical axis Lx1 of the light source apparatus 7 is parallel to the optical axis Lx2 of the entrance optical path 92.

The configuration described above allows the optical parts provided between the light source apparatus 7 and the projection optical apparatus 9, such as the first color separator 831 and the second color separator 833, to be readily disposed with respect to the light exiting optical axis Lx1 of the light source apparatus 7 and the optical axis Lx2 of the entrance optical path 92.

Furthermore, the size of the projector 1A in the direction +X can be reduced as compared with a case where the extension of the light exiting optical axis Lx1 of the light source apparatus 7 inclines in the direction away from the entrance optical path 92 with distance toward the projection optical apparatus 9.

The projector 1A includes the first reflector 832, the blue light modulator 85B as the first light modulator, the green light modulator 85G as the second light modulator, the second reflector 841, the third reflector 842, the red light modulator 85R as the third light modulator, and the color combiner 86.

The light source apparatus 7 outputs the white light WL.

The first color separator 831 as the first reflective optical element transmits the blue light L1 contained in the white light WL outputted by the light source apparatus 7 and reflects the green light L2 and the red light L3 contained in the white light WL. The second color separator 833 as the second reflective optical element reflects the green light L2 and transmits the red light L3 out of the green light L2 and the red light L3 reflected off the first color separator 831. The blue light L1 corresponds to the first color light, the green light L2 corresponds to the second color light, and the red light L3 corresponds to the third color light.

The first reflector 832 reflects the blue light L1 having passed through the first color separator 831.

The blue light modulator 85B modulates the blue light L1 reflected off the first reflector 832.

The green light modulator 85G modulates the green light L2 reflected off and separated by the second color separator 833 out of the light reflected off the first color separator 831.

The second reflector 841 reflects the red light L3 having passed through and having been separated by the second color separator 833 out of the light reflected off the first color separator 831.

The third reflector 842 reflects the red light L3 reflected off the second reflector 841.

The red light modulator 85R modulates the red light L3 reflected off the third reflector 842.

The color combiner 86 outputs combined light that is the combination of the light modulated by the blue light modulator 85B, the light modulated by the green light modulator 85G, and the light modulated by the red light modulator 85R.

The optical axis Lx4 of the green light L2 reflected off the second color separator 833 coincides with the optical axis Lx5 of the combined light having exited out of the color combiner 86.

The configuration described above can suppress protrusion of the blue light modulator 85B, the green light modulator 85G, the red light modulator 85R, and the color combiner 86 in the direction +X beyond the imaginary line VL2. The size of the projector 1A in the direction +X can therefore be reduced.

In the projector 1A, the extension of the light exiting optical axis Lx1 of the light source apparatus 7 coincides with the optical axis Lx6 between the first color separator 831 and the first reflector 832.

The configuration described above allows the first color separator 831 and the first reflector 832 to be readily disposed on the extension of the light exiting optical axis Lx1 of the light source apparatus 7.

The configuration described above can further suppress protrusion of optical parts, such as the light source apparatus 7, in the direction −X beyond the imaginary line VL1 and protrusion of the optical parts, such as the light source apparatus 7, in the direction +X beyond the imaginary line VL2. The size of the projector 1A in the direction +X can therefore be reduced.

In the projector 1A, the light source apparatus 7 includes the solid-state light emitters 7021, the wavelength converter 7081, the diffusive optical element 711, and the light combiner 706.

The wavelength converter 7081 outputs the fluorescence, which is the converted light having wavelengths longer than the wavelength of the first portion of the blue light emitted by the solid-state light emitters 7021.

The diffusive optical element 711 diffuses the second portion of the blue light emitted by the solid-state light emitters 7021.

The color combiner 86 combines the fluorescence outputted by the wavelength converter 7081 with the blue light diffused by the diffusive optical element 711.

The light exiting optical axis Lx1 of the light source apparatus 7 coincides with the optical axis Lx7 of the wavelength converter 7081, which is one of the optical elements, the solid-state light emitters 7021, the wavelength converter 7081, and the diffusive optical element 711. Out of the solid light emitters 7021, the wavelength converter 7081, and the diffusive optical element 711, the solid light emitters 7021 and the diffuse optical element 711, which are two optical elements having optical axes that do not coincide with the light exiting optical axis Lx1 of the light source apparatus 7, face each other. The optical axis Lx8 of the solid-state light emitters 7021 and the optical axis Lx9 of the diffusive optical element 711 are perpendicular to the light exiting optical axis Lx1 of the light source apparatus 7.

The configuration described above allows reduction in the dimensions of the light source apparatus 7 with the amount of light outputted therefrom increased as compared with a light source apparatus including a light source lamp, such as an ultrahigh-pressure mercury lamp.

Furthermore, the aforementioned arrangement of the solid-state light emitters 7021, the wavelength converter 7081, and the diffusive optical element 711 can suppress protrusion of the light source apparatus 7 in the direction −X beyond the imaginary line VL1 and protrusion of the light source apparatus 7 in the direction +X beyond the imaginary line VL2. The size of the projector 1A in the direction +X can therefore be reduced.

The projector 1A includes the heat receiving member 7023, which is provided on the opposite side of the solid-state light emitters 7021 from the light emitting side thereof, that is, in a position shifted in the direction +T and receives the heat of the solid-state light emitters 7021.

The configuration described above allows an increase in the heat dissipation area via which the heat generated by the solid-state light emitters 7021 is dissipated. The heat dissipation efficiency in accordance with which the heat generated by the solid-state light emitters 7021 is dissipated can therefore be increased.

The projector 1A further includes the heat dissipating member 7025, which is coupled to the heat receiving member 7023 in a heat transferable manner.

According to the configuration described above, the heat dissipation area via which the heat generated by the solid-state light emitters 7021 is dissipated can be further increased, whereby the heat dissipation efficiency in accordance with which the heat generated by the solid light emitters 7021 is dissipated can be further increased.

The projector 1A further includes the heat pipes 7024, which transfer the heat transferred from the heat receiving member 7023 to the heat dissipating member 7025.

According to the configuration described above, the heat of the heat receiving member 7023 can be efficiently transferred to the heat dissipating member 7025, whereby the heat dissipation efficiency in accordance with which the heat generated by the solid-state light emitters 7021 is dissipated can further be increased. Even when the heat receiving member 7023 and the heat dissipating member 7025 are disposed so as to be apart from each other, the heat pipes 7024 can efficiently transfer the heat from the heat receiving member 7023 to the heat dissipating member 7025. The flexibility of the layout of the heat dissipating member 7025 can therefore be increased.

In the projector 1A, the deflection member 93 deflects at an acute angle the direction of the light having traveled along the entrance optical path 92. The straight line LN, which passes through the position PS1, where the optical axis Lx8 of the entire solid-state light emitters 7021, the optical axis Lx7 of the wavelength converter 7081, and the optical axis Lx9 of the diffusive optical element 711 intersect with one another, and which is perpendicular to the passage optical path 94, is shifted in the direction −X, which is the direction in which the light travels along the passage optical path 94, from the position PS2, where the deflection member 93 deflects the light having traveled along the entrance optical path 92.

The configuration described above allows the light source apparatus 7 to be readily disposed between the imaginary line VL1 and the imaginary line VL2. The configuration described above can therefore suppress protrusion of the light source apparatus 7 in the direction −X beyond the imaginary line VL1 and protrusion of the light source apparatus 7 in the direction +X beyond the imaginary line VL2. Furthermore, the optical parts that guide the light outputted from the light source apparatus 7 to the projection optical apparatus 9 can be readily disposed between the imaginary line VL1 and the imaginary line VL2. The size of the projector 1A in the direction +X can therefore be reduced.

The projector 1A includes the fans 54 and 55, which are provided in the space between the light source apparatus 7 and the projection optical apparatus 9 and located on the opposite side of the extension of the light exiting optical axis Lx1 of the light source apparatus 7 from the optical axis LX2 of the entrance optical path 92.

According to the configuration described above, the fans 54 and 55 are disposed in positions shifted in the direction −X from the extension of the light exiting optical axis Lx1 of the light source apparatus 7. The configuration described above allows the fans 54 and 55 to be disposed in a region that is likely to form a dead space in the projector 1A. Therefore, since the parts can be disposed in a packed manner in the projector 1A, the dimensions of the projector 1A can be reduced, and the size of the projector 1A can therefore be reduced.

Variation of First Embodiment

Figure 9:
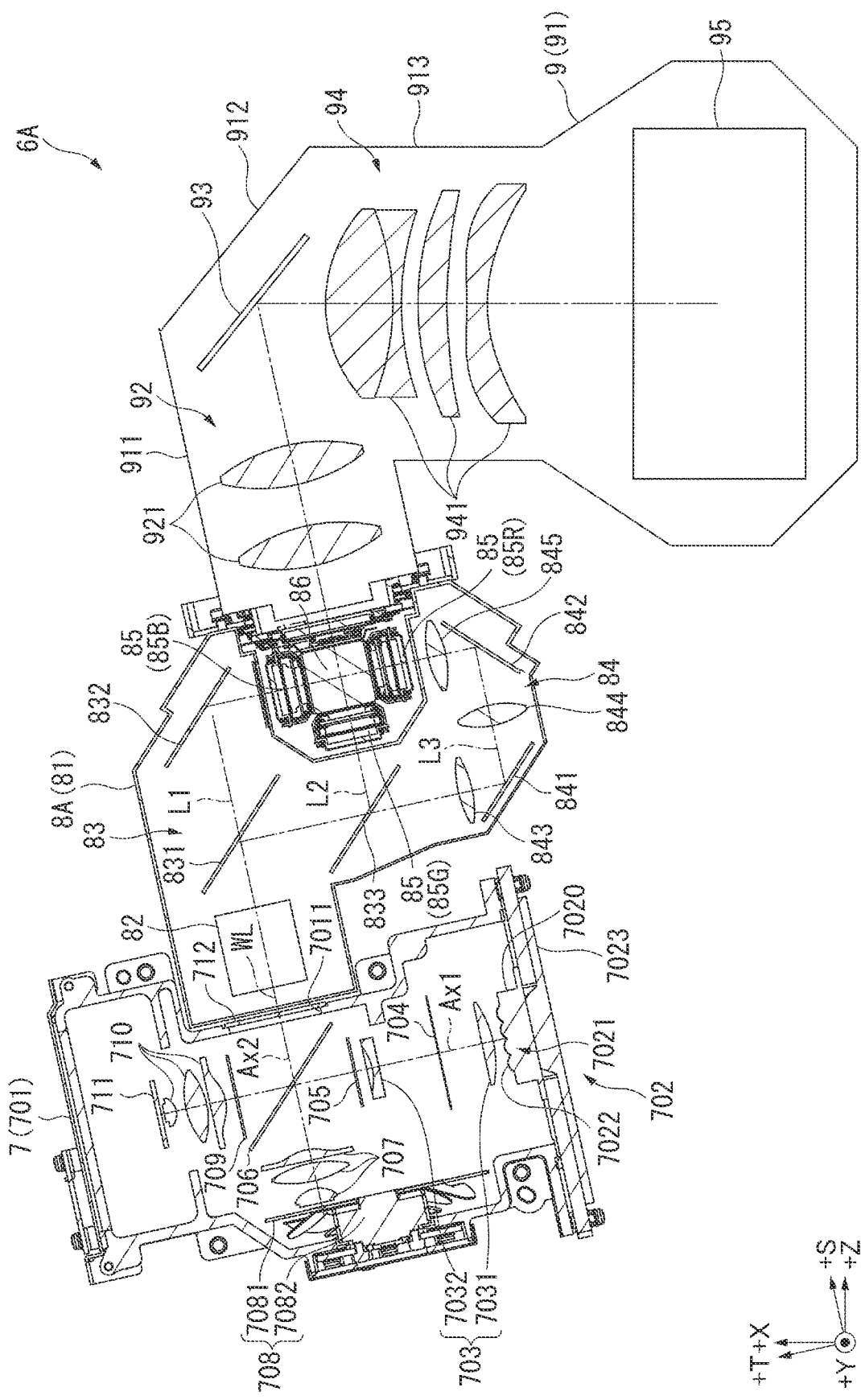
FIG. 9 is a diagrammatic view showing a variation of the image projection apparatus according to the first embodiment.

FIG. 9 is a diagrammatic view showing the configuration of an image projection apparatus 6A, which is a variation of the image projection apparatus 6.

In the image projection apparatus 6 of the projector 1A, the solid-state light emitters 7021, which form the light source apparatus 7, emit the light in the direction −T, and the diffusive optical element 711 reflects the blue light in the direction +T. The light source apparatus 7 may, however, be so disposed that the solid-state light emitters 7021 emit the blue light in the direction +T and the diffusive optical element 711 reflects the blue light in the direction −T. That is, the projector 1A may include the image projection apparatus 6A shown in FIG. 9 in place of the image projection apparatus 6.

The image projection apparatus 6A includes the light source apparatus 7, the image generation apparatus 8A, and the projection optical apparatus 9, as the image projection apparatus 6 does. The projection optical apparatus 9 is disposed in the exterior enclosure 2A substantially at the center thereof in the direction +Z, and the light source apparatus 7 and the image generation apparatus 8A are disposed in positions shifted in the direction −Z from the projection optical apparatus 9.

In the image projection apparatus 6A, the light source apparatus 7 is disposed so as to pivot by 180° around the light exiting optical axis Lx1, and the image generation apparatus 8A is disposed so as to pivot by 180° around the optical axis Lx5.

Therefore, in the light source apparatus 7 in the image projection apparatus 6A and the light source apparatus 7 in the image projection apparatus 6, the wavelength converter 7081 outputs the fluorescence in the same direction, and the white light WL exits via the exit port 7011 in the same direction.

However, in the light source apparatus 7 in the image projection apparatus 6A and the light source apparatus 7 in the image projection apparatus 6, the solid-state light emitters 7021 output the blue light in opposite directions, and the diffusive optical element 711 reflects the blue light in opposite directions. That is, in the light source apparatus 7 in the image projection apparatus 6A, the plurality of solid-state light emitters 7021 are disposed in a position shifted in the direction −T, which is the direction toward the entrance optical path 92, from the light exiting optical axis Lx1 of the light source apparatus 7, and the diffusive optical element 711 is disposed in a position shifted in the direction +T, which is the direction toward the opposite side from the entrance optical path 92, from the light exiting optical axis Lx1 of the light source apparatus 7. The plurality of solid-state light emitters 7021 emit the blue light in the direction +T, and the diffusive optical element 711 reflects the blue light in the direction −T.

In the image generation apparatus 8A of the image projection apparatus 6A, the homogenizer 82, the first color separator 831, and the first reflector 832 are disposed in the light exiting optical axis Lx1 of the light source apparatus 7. However, the first color separator 831 reflects the green light L2 and the red light L3 in the direction −T, and the first reflector 832 reflects the blue light L1 in the direction −T. The reflected blue light L1 is modulated by the blue light modulator 85B and enters the color combiner 86 along the direction −T.

Out of the green light L2 and the red light L3 reflected off the first color separator 831, the green light L2 is reflected in the direction +S off the second color separator 833 disposed in a position shifted in the direction −T from the first color separator 831, and the red light L3 passes through the second color separator 833 in the direction −T.

The green light L2 reflected off the second color separator 833 is modulated by the green light modulator 85G and enters the color combiner 86 along the direction +S.

The red light L3 having passed through the second color separator 833 is reflected in the direction +S off the second reflector 841 disposed in a position shifted in the direction −T from the second color separator 833, and the red light L3 reflected in the direction +S is reflected in the direction +T off the third reflector 842. The red light L3 reflected off the third reflector 842 is modulated by the red light modulator 85R and enters the color combiner 86 along the direction +T.

The light-incident-side lens 843 is provided between the second color separator 833 and the second reflector 841. The relay lens 844 is provided between the second reflector 841 and the third reflector 842. The light-exiting-side lens 845 is disposed between the third reflector 842 and the red light modulator 85R.

Figure 10:
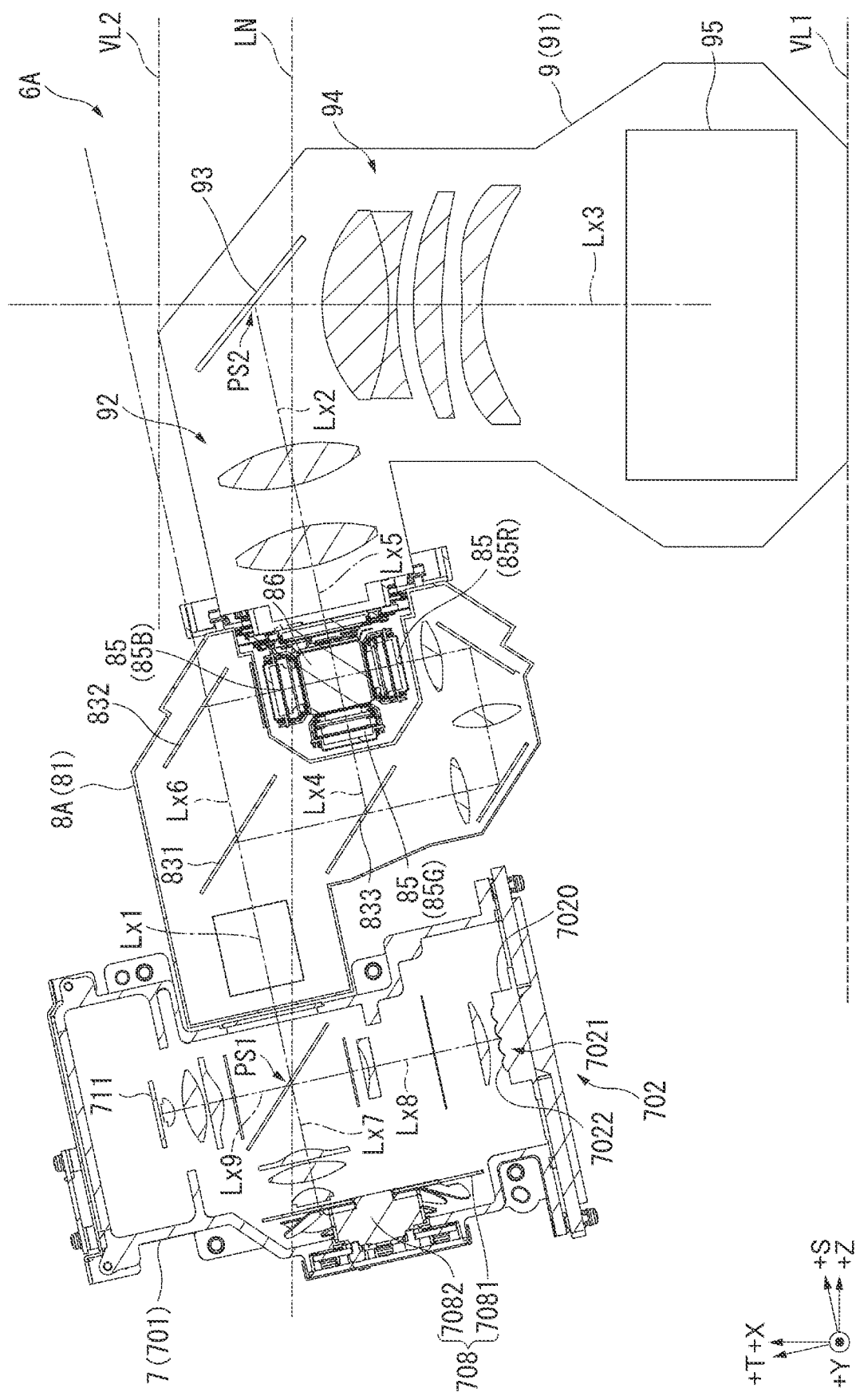
FIG. 10 shows the optical axis of each optical part in the variation of the image projection apparatus according to the first embodiment.

The blue light L1, the green light L2, and the red light L3 having entered the color combiner 86 are combined with one another by the color combiner 86, and the color combiner 86 outputs the image light in the direction +S along the optical axis Lx5 parallel to the direction +S. The image light having exited out of the color combiner 86 enters the entrance optical path 92 and is projected by the projection optical apparatus 9. Position of each optical axis in the image projection apparatus FIG. 10 describes the optical axes of the optical parts in the image projection apparatus 6A. In FIG. 10, only some of the optical parts that form the image projection apparatus 6A have reference characters for clarity of illustration.

The light exiting optical axis Lx1 of the light source apparatus 7 is parallel to the optical axis Lx2 of the entrance optical path 92 also in the image projection apparatus 6A, as shown in FIG. 10. On the other hand, the light exiting optical axis Lx1 of the light source apparatus 7 is provided in a position shifted in the direction +T from the optical axis Lx2 of the entrance optical path 92, so that the extension of the light exiting optical axis Lx1 of the light source apparatus 7 does not coincide with the extension of the optical axis of the entrance optical path 92.

The extension of the light exiting optical axis Lx1 of the light source apparatus 7 intersects with the extension containing the optical axis Lx3 of the passage optical path 94. In detail, the extension of the light exiting optical axis Lx1 of the light source apparatus 7 intersects with part of the extension of the optical axis Lx3 of the passage optical path 94, the extension that extends in the direction +X, which is the direction opposite to the direction in which the image light travels along the passage optical path 94.

Also in the image projection apparatus 6A, the optical axis Lx4 of the green light L2 reflected off the second color separator 833 coincides with the optical axis Lx5 of the image light, which is the combined light as the result of the combination performed by the color combiner 86. The optical axis Lx5 of the image light having exited out of the color combiner 86 coincides with the optical axis Lx2 of the entrance optical path 92.

The extension of the light exiting optical axis Lx1 of the light source apparatus 7 coincides with the optical axis Lx6 between the first color separator 831 and the first reflector 832.

The light exiting optical axis Lx1 of the light source apparatus 7 coincides with the optical axis Lx7 of the wavelength converter 7081.

The solid-state light emitters 7021 and the diffusive optical element 711, which have optical axes that do not coincide with the light exiting optical axis Lx1 of the light source apparatus, face each other. The optical axis Lx8 of the entire solid-state light emitters 7021 and the optical axis Lx9 of the diffusive optical element 711 coincide with each other and are perpendicular to the extension of the light exiting optical axis Lx1 of the light source apparatus 7.

The optical axis Lx8 of the entire solid-state light emitters 7021, the optical axis Lx7 of the wavelength converter 7081, and the optical axis Lx9 of the diffusive optical element 711 intersect with one another at the light combiner 706. The deflection member 93 deflects at an acute angle the direction of the image light having traveled along the entrance optical path 92 to guide the image light incident from the entrance optical path 92 to the passage optical path 94.

The straight line LN, which passes through the position PS1 and is perpendicular to the passage optical path 94, is shifted in the direction in which the image light travels along the passage optical path 94, that is, in the direction −X from the position PS2 when viewed in the direction +Y.

The projector 1A including the image projection apparatus 6A described above can provide the effects below as well as the same effects provided by the projector 1A including the image projection apparatus 6.

In the image projection apparatus 6A, the extension of the light exiting optical axis Lx1 of the light source apparatus 7 intersects with part of the extension containing the optical axis Lx3 of the passage optical path 94, the extension extending in the direction opposite to the direction in which the light travels along the passage optical path 94, that is, in the direction +X.

The configuration described above can suppress protrusion of the light source apparatus 7 and the image generation apparatus 8A in the direction −X beyond the imaginary line VL1. The size of the projector 1A in the direction +X can therefore be reduced.

When a light source apparatus 7 that outputs high-luminance light is provided, the amount of heat from the light source apparatus 7 increases. When such light source apparatus 7 is present in the vicinity of the projection optical apparatus 9, the lens enclosure 91 of the projection optical apparatus 9 can be thermally deformed depending on the material of the lens enclosure 91, and the thermal deformation may cause disadvantageous optical effects. In contrast, the extension of the light exiting optical axis Lx1 of the light source apparatus 7 intersects with part of the extension containing the optical axis Lx3 of the passage optical path 94, the extension extending in the direction opposite to the direction in which the light travels along the passage optical path 94, causing no such effects.

Second Embodiment

A second embodiment of the present disclosure will next be described.

The projector according to the present embodiment has the same configuration as that of the projector 1A according to the first embodiment but differs therefrom in terms of the configuration of the image generation apparatus. In the following description, portions that are the same or substantially the same as the portions having been already described have the same reference characters and will not be described.

Figure 11:
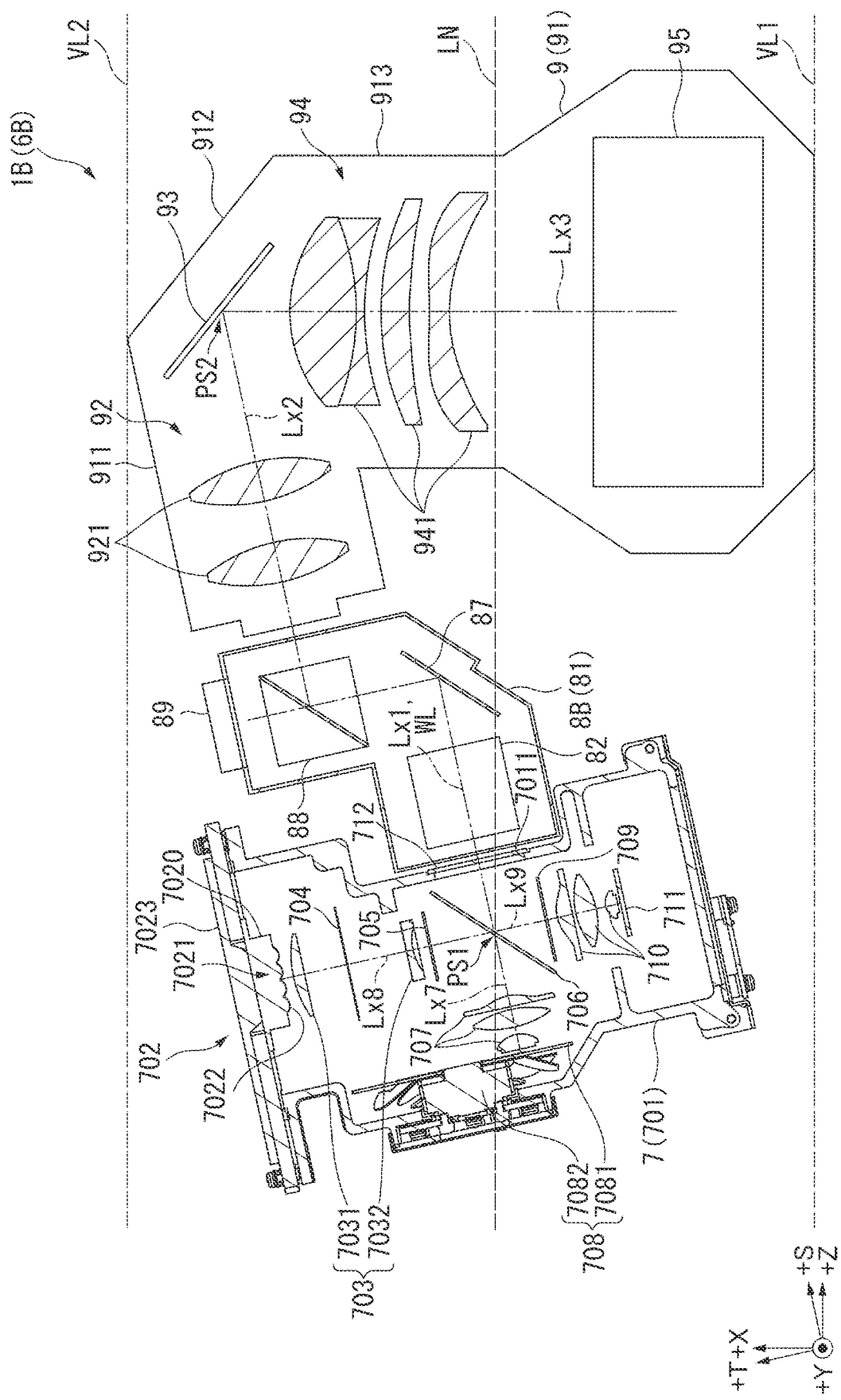
FIG. 11 is a diagrammatic view showing the configuration of an image projection apparatus of a projector according to a second embodiment.

FIG. 11 is a diagrammatic view showing the configuration of an image projection apparatus 6B provided in a projector 1B according to the present embodiment.

The projector 1B according to the present embodiment corresponds to the projection apparatus. The projector 1B has the same configuration and function as those of the projector 1A according to the first embodiment except that the image projection apparatus 6 is replaced with the image projection apparatus 6B shown in FIG. 11.

The image projection apparatus 6B has the same configuration and function as those of the image projection apparatus 6A except that the image generation apparatus 8A is replaced with an image generation apparatus 8B, as shown in FIG. 11. That is, the image projection apparatus 6B includes the light source apparatus 7, the image generation apparatus 8B, and the projection optical apparatus 9. The arrangement of the light source apparatus 7 in the image projection apparatus 6B shown in FIG. 11 is the same as the arrangement of the light source apparatus 7 in the image projection apparatus 6 shown in FIG. 6 and may instead be the same as the arrangement of the light source apparatus 7 in the image projection apparatus 6A shown in FIG. 9.

The image generation apparatus 8B includes the enclosure 81 and the following components accommodated in the enclosure 81: the homogenizer 82; a first reflective optical element 87; a second reflective optical element 88; and an image generator 89. In addition to the above, the image generation apparatus 8B includes a retardation film, a polarizer, and a lens as required.

The first reflective optical element 87 is a reflection mirror and is disposed on the extension of the light exiting optical axis Lx1 of the light source apparatus 7. The first reflective optical element 87 receives the white light WL along the direction +S from the light source apparatus 7 via the homogenizer 82. The first reflective optical element 87 reflects in the direction +T the white light WL incident thereon.

The second reflective optical element 88 is disposed in a position shifted in the direction +T from the first reflective optical element 87. The second reflective optical element 88 transmits the white light WL incident from the first reflective optical element 87. The second reflective optical element 88 reflects in the direction +S image light modulated by the image generator 89 and incident in the direction −T on the second reflective optical element 88. The reflected image light enters the entrance optical path 92 of the projection optical apparatus 9, which is disposed in a position shifted in the direction +Z from the second reflective optical element 88.

The image generator 89 is disposed in a position shifted in the direction +T from the second reflective optical element 88. The image generator 89 modulates the white light WL incident from the second reflective optical element 88 to generate image light and outputs the image light in the direction −T. The image generator 89 may be a reflective liquid crystal display device, such as an LCOS (liquid crystal on silicon) device or a device using micromirrors, such as a DMD (digital micromirror device).

Position of Each Optical Axis in the Image Projection Apparatus

In the image projection apparatus 6B, the light exiting optical axis Lx1 of the light source apparatus 7 is parallel to the optical axis Lx2 of the entrance optical path 92, but the extension of the light exiting optical axis Lx1 of the light source apparatus 7 does not coincide with the optical axis Lx2 of the entrance optical path 92.

The extension of the light exiting optical axis Lx1 of the light source apparatus 7 intersects with the extension containing the optical axis Lx3 of the passage optical path 94. In the image projection apparatus 6B, the extension of the light exiting optical axis Lx1 intersects with the optical axis Lx3 of the passage optical path 94.

The light exiting optical axis Lx1 of the light source apparatus 7 coincides with the optical axis Lx7 of the wavelength converter 7081.

The solid-state light emitters 7021 and the diffusive optical element 711, which have optical axes that do not coincide with the light exiting optical axis Lx1 of the light source apparatus 7, face each other. The optical axis Lx8 of the entire solid-state light emitters 7021 and the optical axis Lx9 of the diffusive optical element 711 coincide with each other and are perpendicular to the extension of the light exiting optical axis Lx1 of the light source apparatus 7.

The optical axis Lx8 of the entire solid-state light emitters 7021, the optical axis Lx7 of the wavelength converter 7081, and the optical axis Lx9 of the diffusive optical element 711 intersect with one another at the light combiner 706. The deflection member 93 deflects at an acute angle the direction of the image light having traveled along the entrance optical path 92 to guide the image light incident from the entrance optical path 92 to the passage optical path 94. The straight line LN, which passes through the position PS1 and is perpendicular to the passage optical path 94, is located in a position shifted in the direction in which the image light travels along the passage optical path 94, that is, in the direction −X from the position PS2 when viewed in the direction +Y.

Effects of Second Embodiment

The projector 1B according to the present embodiment described above can provide the effects below as well as the same effects provided by the projector 1A according to the first embodiment.

The projector 1B, which is the projection apparatus, includes the image generator 89. The image generator 89 generates image light from the light having passed through the second reflective optical element 88 and outputs the image light in the direction −T, which is the direction opposite to the direction in which the white light WL is incident from the second reflective optical element 88. The second reflective optical element 88 transmits the white light WL incident from the first reflective optical element 87 to cause the white light WL to enter the image generator 89 and reflects the image light incident from the image generator 89 to cause the image light to exit toward the projection optical apparatus 9.

According to the configuration described above, the optical axis of the image light from the second reflective optical element 88, which causes the image light incident from the image generator 89 to exit to the projection optical apparatus 9, coincides with the optical axis Lx2 of the entrance optical path 92. The image generator 89 can thus be more readily disposed between the imaginary line VL1 and the imaginary line VL2. An increase in the dimension of the projector 1B in the direction +X can be suppressed, and the size of the projector 1B can therefore be reduced as compared with a case where the image generator 89 is disposed in a position shifted in the direction +X from the imaginary line VL2.

Third Embodiment

A third embodiment of the present disclosure will next be described.

The projector according to the present embodiment has the same configuration as that of the projector 1A according to the first embodiment but differs therefrom in terms of the position of the introduction port with which the exterior enclosure is provided and the configuration of the cooler. In the following description, portions that are the same or substantially the same as the portions having been already described have the same reference characters and will not be described.

Figure 12:
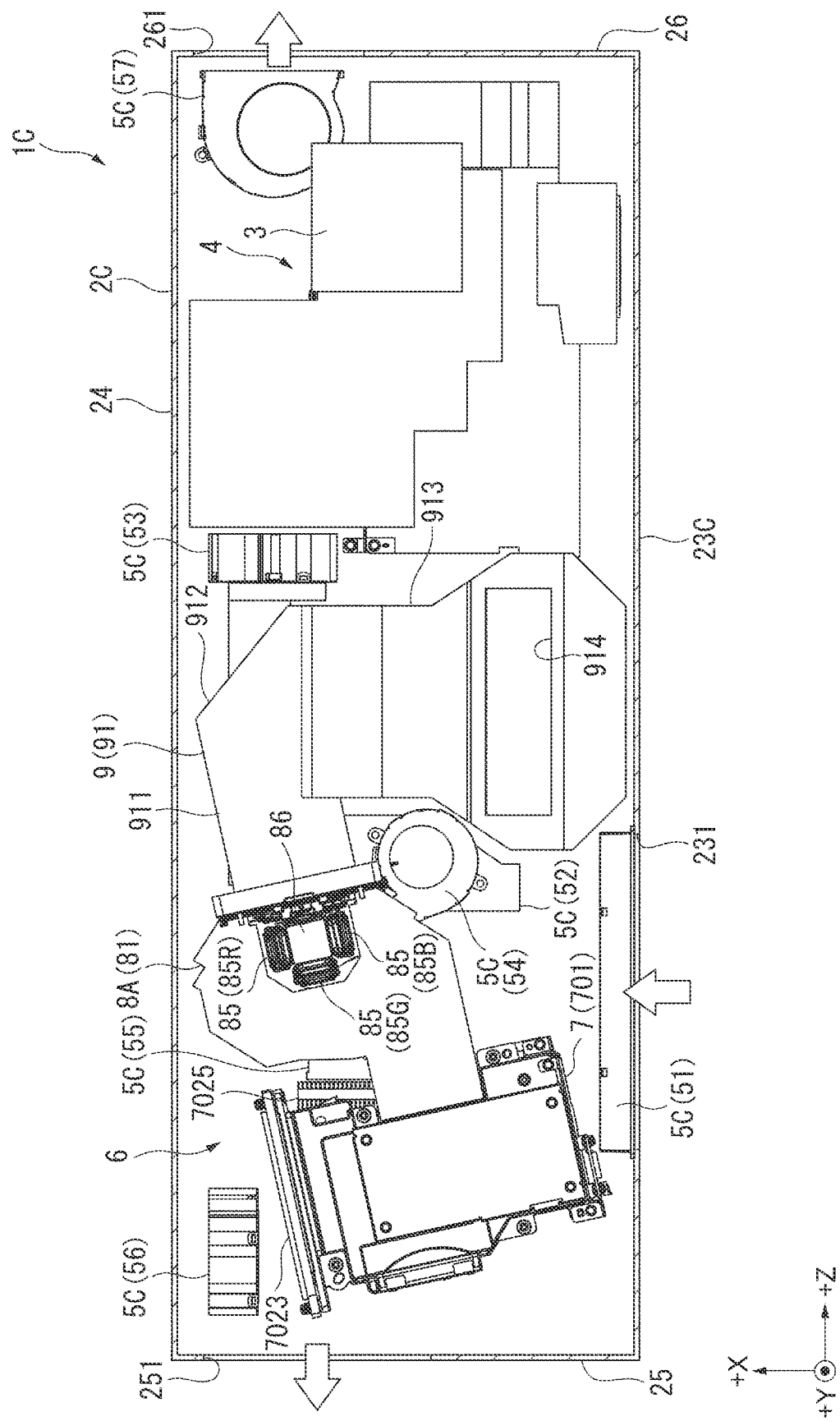
FIG. 12 shows the internal configuration of a projector according to a third embodiment.

FIG. 12 is a plan view showing the internal configuration of a projector 1C according to the present embodiment. Specifically, FIG. 12 shows the configuration of the interior of an exterior enclosure 2C of the projector 1C viewed in the direction +Y. In FIG. 12, the heat pipes 7024 are not shown.

The projector 1C according to the present embodiment corresponds to the projection apparatus. The projector 1C has the same configuration and function as those of the projector 1A according to the first embodiment except that the exterior enclosure 2A and the cooler 5A are replaced with the exterior enclosure 2C and a cooler 5C, as shown in FIG. 12.

The exterior enclosure 2C has the same configuration and function as those of the exterior enclosure 2A according to the first embodiment except that the front surface 23 is replaced with a front surface 23C.

The front surface 23C has an introduction port 231, which is located in a position shifted in the direction −Z from a central portion of the front surface 23C in the direction +Z. The introduction port 231 introduces gases outside the exterior enclosure 2C as the cooling gas into the exterior enclosure 2C.

In the present embodiment, the opening 251 provided at the left side surface 25 and the opening 261 provided at the right side surface 26 each function as the discharge port via which the cooling gas in the exterior enclosure 2C is discharged.

The cooler 5C cools the cooling targets provided in the exterior enclosure 2C, as the cooler 5A according to the first embodiment does. The cooler 5C has the same configuration and function as those of the cooler 5A except that the cooler 5C further includes a fan 57. That is, the cooler 5C includes the filter 51, the duct 52, and the fans 53 to 57.

The filter 51 is fitted to the introduction port 231 in an attachable and detachable manner. The filter 51 is provided along with the introduction port 231 in the space shifted in the direction −Z from the projection optical apparatus 9.

The duct 52 causes the space shifted in the direction −Z from the projection optical apparatus 9 to communicate with the space shifted in the direction +Z from the projection optical apparatus 9. That is, one end of the duct 52 opens into the space shifted in the direction −Z from the projection optical apparatus 9, and the other end of the duct 52 opens into the space shifted in the direction +Z from the projection optical apparatus 9. The duct 52 guides part of the cooling gas having passed through the filter 51 to the fan 53, which is located in a position shifted in the direction +Z from projection optical apparatus 9.

The fan 53 sends the cooling gas guided through the duct 52 to the controller 3 and the power supply 4 to cool the controller 3 and the power supply 4.

The fans 54 to 56 are disposed in positions shifted in the direction −Z from the projection optical apparatus 9.

The fan 54 is disposed in a position sandwiched between the light source apparatus 7 and the projection optical apparatus 9 in the direction +Z and shifted in the direction −X from the image generation apparatus 8A. That is, the fan 54 is provided in a position sandwiched between the light source apparatus 7 and the projection optical apparatus 9 in the direction +Z and located on the opposite side of the light exiting optical axis Lx1 of the light source apparatus 7, which is not shown in FIG. 13, from the optical axis Lx2 of the entrance optical path 92. The fan 54 sends part of the cooling gas having passed through the filter 51 to the light modulation apparatus 85 to cool the light modulation apparatus 85.

The fan 55 is disposed in a position shifted the direction −Y from the image generation apparatus 8A. The fan 55 sends part of the cooling gas having passed through the filter 51 to the heat dissipating member 7025, which is disposed in a position shifted in the direction −Y from the light source enclosure 701, to cool the heat dissipating member 7025.

The fan 56 is disposed in the exterior enclosure 2C and located at the corner shifted in the directions +X and −Z. The fan 56 discharges the cooling gas having cooled the cooling targets disposed in positions shifted in the direction −Z from the projection optical apparatus 9 out of the exterior enclosure 2C via the opening 251.

The fan 57 is disposed in the exterior enclosure 2C and located at the corner shifted in the directions+X and +Z. The fan 57 discharges the cooling gas having cooled the cooling targets disposed in positions shifted in the direction +Z from the projection optical apparatus 9 out of the exterior enclosure 2C via the opening 261.

Effects of Third Embodiment

The projector 1C according to the present embodiment described above can provide the same effects as those provided by the projector 1A according to the first embodiment.

The projector 1C may include the image projection apparatus 6A or 6B in place of the image projection apparatus 6. The image generation apparatus of the image projection apparatus provided in the projector 1C is not limited to the image generation apparatus 8A and may be the image generation apparatus 8B. The position of the duct in the projector 1C is not limited to the position described above, and the number of fans and the positions thereof are not limited to the those described above.

Fourth Embodiment

A fourth embodiment of the present disclosure will next be described.

The projector according to the present embodiment has the same configuration as that of the projector 1A according to the first embodiment and including the image projection apparatus 6A but differs from the projector 1A in that an introduction port via which the cooling gas is introduced into the exterior enclosure is provided at the bottom surface of the exterior enclosure. In the following description, portions that are the same or substantially the same as the portions having been already described have the same reference characters and will not be described.

Figure 13:
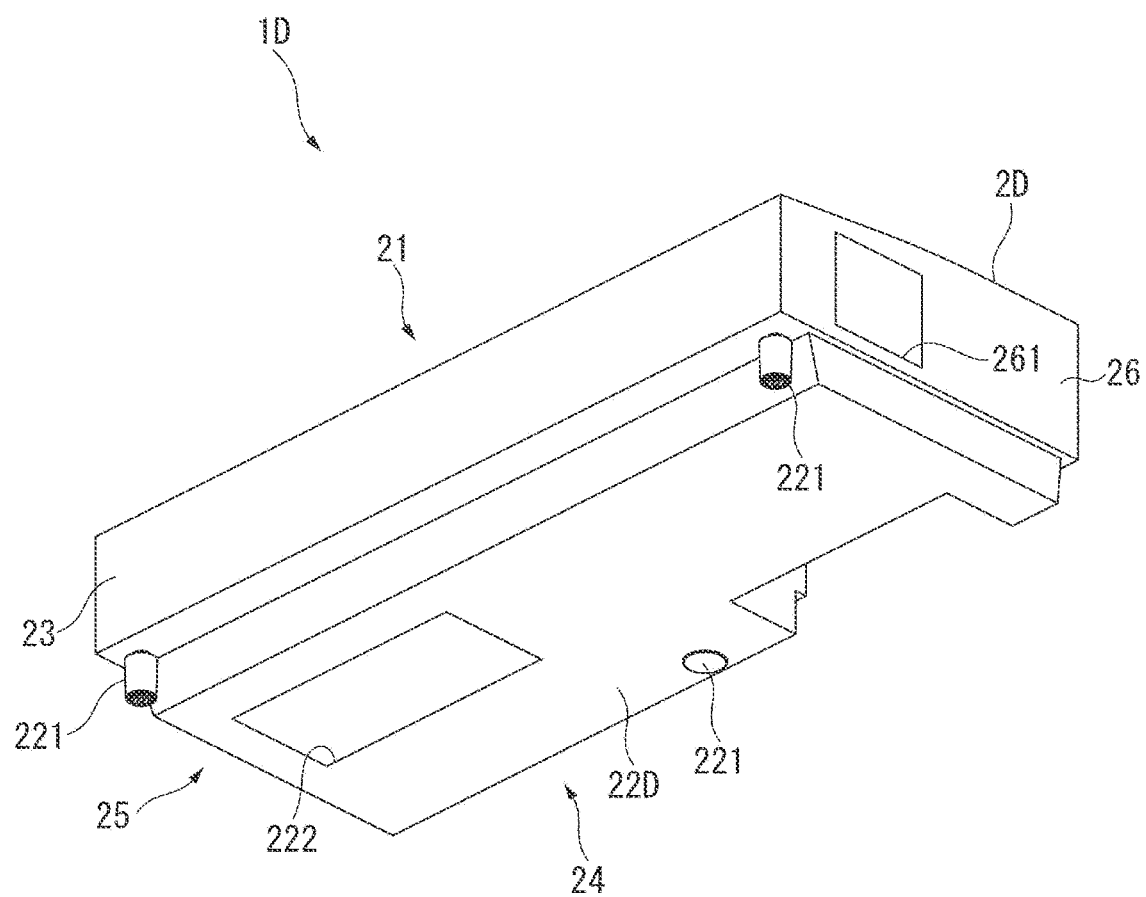
FIG. 13 is a perspective view showing the exterior appearance of a projector according to a fourth embodiment.
Figure 14:
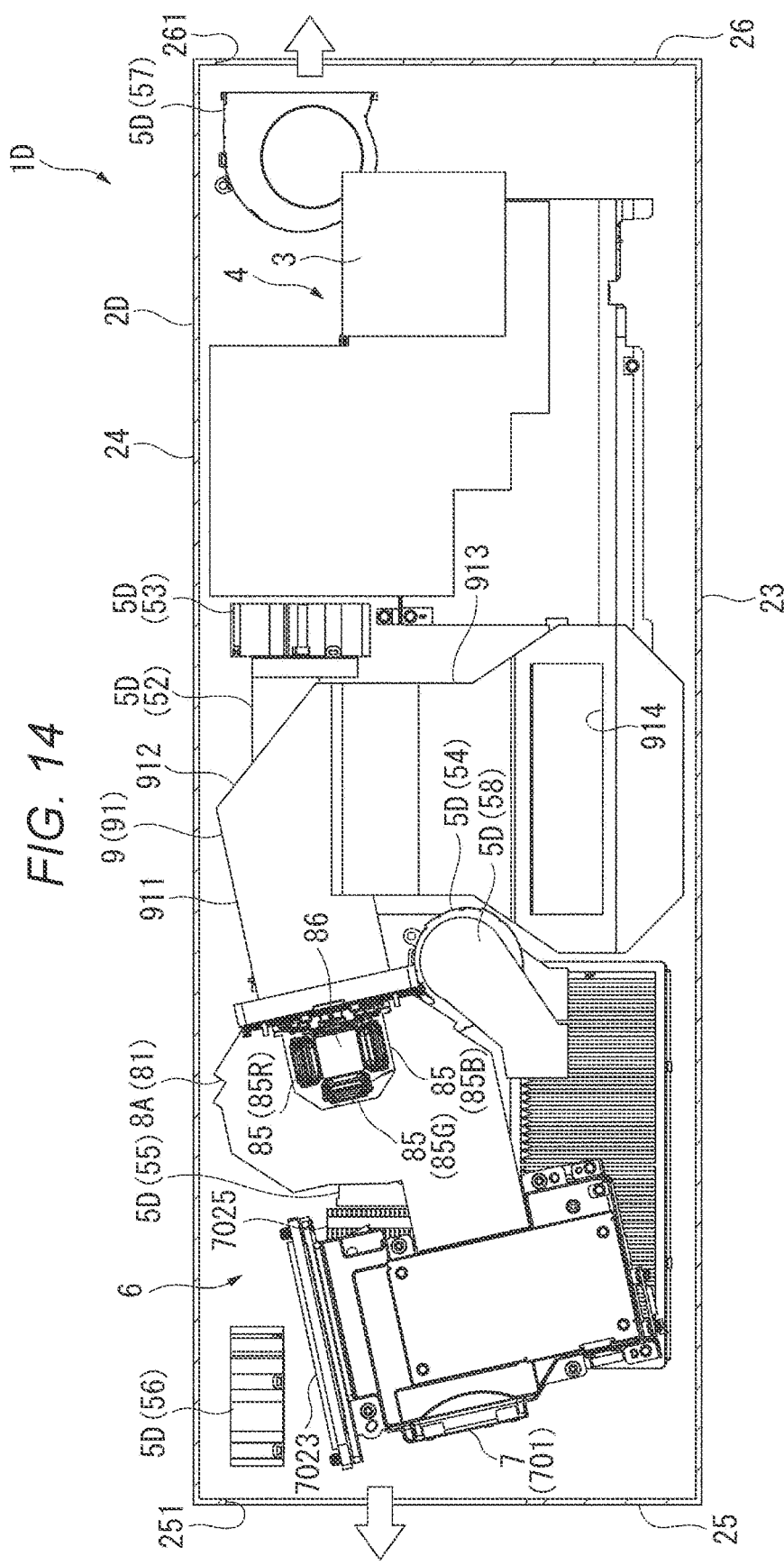
FIG. 14 shows the internal configuration of the projector according to the fourth embodiment.
Figure 15:
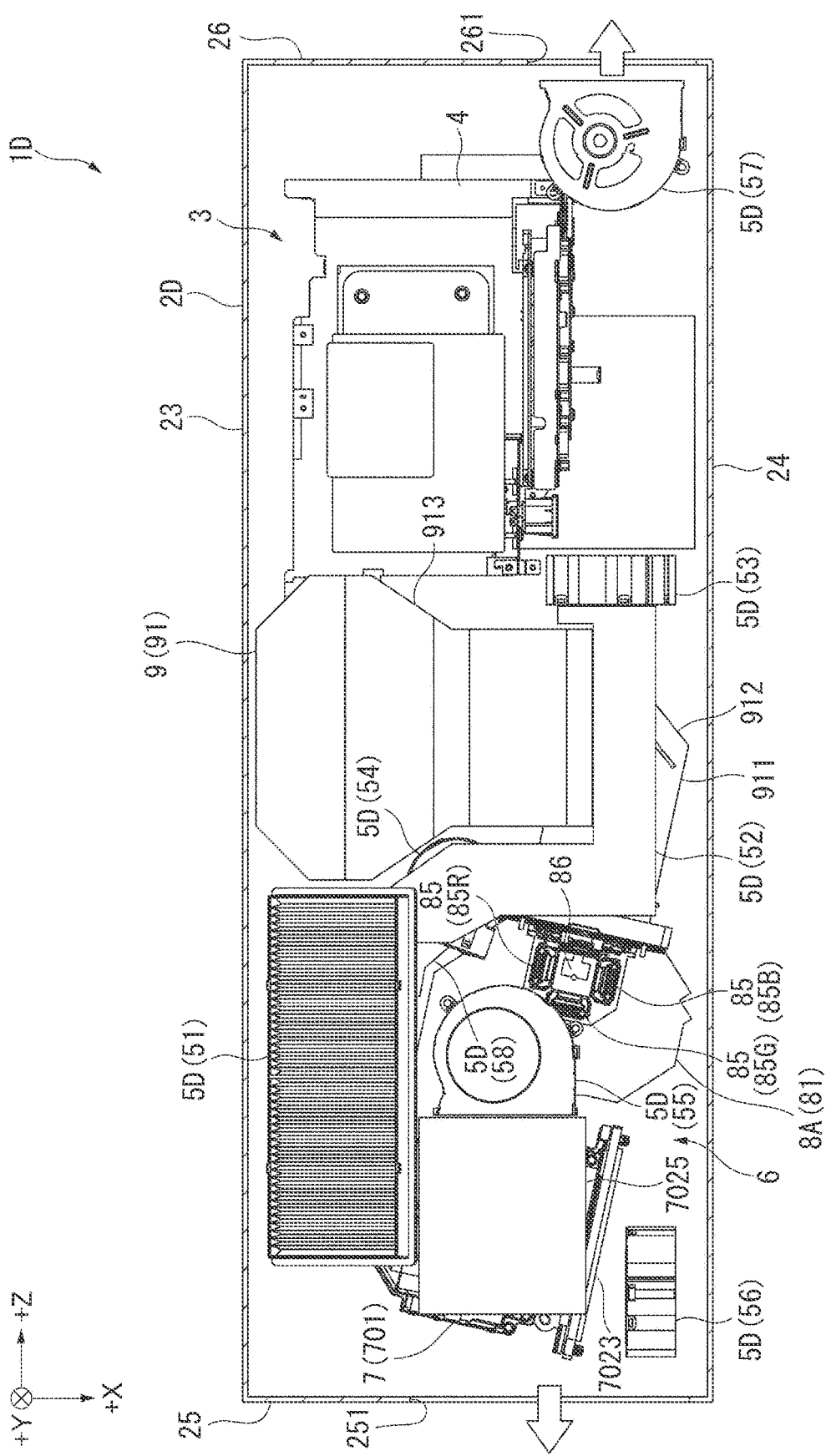
FIG. 15 shows the internal configuration of the projector according to the fourth embodiment.

FIG. 13 is a perspective view showing the exterior appearance of a projector 1D according to the present embodiment. In detail, FIG. 13 is a perspective view showing the projector 1D viewed from the side facing a bottom surface 22D. FIG. 14 shows the internal configuration of the projector 1D viewed in the direction +Y, and FIG. 15 shows the internal configuration of the projector 1D viewed in the direction −Y.

The projector 1D according to the present embodiment corresponds to the projection apparatus. The projector 1D has the same configuration and function as those of the projector 1A including the image projection apparatus 6A except that the exterior enclosure 2A and the cooler 5A are replaced with an exterior enclosure 2D shown in FIG. 13 and a cooler 5D shown in FIGS. 14 and 15.

The exterior enclosure 2D has the same configuration and function as those of the exterior enclosure 2A except that the bottom surface 22 is replaced with the bottom surface 22D, as shown in FIG. 13.

The bottom surface 22D is provided with the plurality of legs 221 and has an introduction port 222 in a position shifted in the directions −X and −Z. The introduction port 222 introduces gases outside the exterior enclosure 2D as the cooling gas into the exterior enclosure 2D.

In the present embodiment, the opening 251 provided at the left side surface 25 and the opening 261 provided at the right side surface 26 each function as the discharge port via which the cooling gas in the exterior enclosure 2D is discharged.

The cooler 5D is provided in the exterior enclosure 2D and cools the cooling targets in the projector 1D, as shown in FIGS. 14 and 15. The cooler 5D has the same configuration and function as those of the cooler 5C except that the cooler 5D further includes a duct 58. That is, the cooler 5D includes the filter 51, the duct 52, the fans 53 to 57, and the duct 58.

The filter 51 is provided at the introduction port 222, which opens into the space shifted in the direction −Z from the projection optical apparatus 9, in an attachable and detachable manner.

The duct 52 guides part of the cooling gas having passed through the filter 51 to the fan 53, which is located in a position shifted in the direction +Z from projection optical apparatus 9.

The duct 58 is coupled to the fan 54 and guides part of the cooling gas having passed through the filter 51 to the fan 54.

The fans 53 to 57 function as the fans 53 to 57 in the cooler 5C do.

Effects of Fourth Embodiment

The projector 1D according to the present embodiment described above can provide the same effects as those provided by the projector 1A according to the first embodiment.

In the projector 1D, in which the introduction port 222 opens into the space shifted in the direction −Z from the projection optical apparatus 9 in the exterior enclosure 2D, the image projection apparatus 6 is employed to provide the fan 56 in a position where the fan 56 does not overlap with the introduction port 222, but not necessarily. Depending on the position of the introduction port 222 at the bottom surface 22D, the image projection apparatus 6A may be employed in place of the image projection apparatus 6. The image generation apparatus of the image projection apparatus provided in the projector 1D is not limited to the image generation apparatus 8A and may be the image generation apparatus 8B. In addition to the above, the number of ducts and the positions thereof in the projector 1D are not limited to those described above, and the number of fans and the positions thereof in the projector 1D are not limited to the those described above.

Variations of Embodiments

The present disclosure is not limited to the embodiments described above, and variations, improvements, and other modifications to the extent that the advantage of the present disclosure is achieved fall within the scope of the present disclosure.

In each of the embodiments described above, the projection optical apparatus 9 includes the optical path changing member 95, which reflects in the directions+X and +Y the image light having traveled in the direction −X along the passage optical path 94 to reverse the traveling direction of the image light, but not necessarily. The optical path changing member 95 may be omitted. That is, the projection optical apparatus 9 may project in the direction −X the image light having traveled along the passage optical path 94.

In each of the embodiments described above, the deflection member 93 deflects at an acute angle the direction of the image light having traveled along the entrance optical path 92. That is, the optical axis Lx2 of the entrance optical path 92 and the optical axis Lx3 of the passage optical path 94, along which the image light deflected by the deflection member 93 travels, forms an acute angle of intersection, but not necessarily. The angle of intersection of the optical axis Lx2 and the optical axis Lx3 may be a right or obtuse angle. That is, the deflection member 93 may deflect the direction of the image light having traveled along the entrance optical path 92 at a right or obtuse angle. The angle of intersection of the optical axis Lx2 and the optical axis Lx3 is not limited to about 77.5° when the angle of intersection is an acute angle.

In each of the embodiments described above, the extension of the light exiting optical axis Lx1 of the light source apparatus 7 intersects with the extension containing the optical axis Lx3 of the passage optical path 94, but not necessarily. The light exiting optical axis Lx1 of the light source apparatus 7 may not intersect with the optical axis Lx3, as in the image projection apparatus 6A. Furthermore, the extension of the light exiting optical axis Lx1 of the light source apparatus 7 may intersect with part of the extension of the optical axis Lx3, the extension extending from the optical axis Lx3 in the direction −X.

The light exiting optical axis Lx1 of the light source apparatus 7 is parallel to the optical axis Lx2 of the entrance optical path 92 but may instead not be parallel to the optical axis Lx2 of the entrance optical path 92.

In each of the embodiments described above, the light source apparatus 7 includes the solid-state light emitters 7021, the wavelength converter 7081, and the diffusive optical element 711, but not necessarily. The light source apparatus 7 may be configured to include a light source lamp, such as an ultrahigh-pressure mercury lamp, or include a solid-state light emitter that emits the blue light L1, a solid-state light emitter that emits the green light L2, and a solid-state light emitter that emits the red light L3. The layout of the optical parts that form the light source apparatus 7 is not limited to the layout described above and can be changed as appropriate.

In each of the embodiments described above, the wavelength converter 7081 is rotated by the rotator 7082, but not necessarily. The wavelength converter 7081 may not to be rotated. That is, the rotator 7082 may be omitted.

In each of the embodiments described above, the wavelength converter 7081 is disposed on the extension of the light exiting optical axis Lx1 of the light source apparatus 7. The diffusive optical element 711 is disposed so as to face the solid-state light emitters 7021 so that the optical axis Lx9 of the diffusive optical element 711 coincides with the optical axis Lx8 of the entire solid-state light emitters 7021, and the optical axis Lx8 of the entire solid-state light emitters 7021 and the optical axis Lx9 of the diffusive optical element 711 are perpendicular to the extension of the light exiting optical axis Lx1, which coincides with the optical axis Lx7 of the wavelength converter 7081. However, the configuration described above is not necessarily employed, and the wavelength converter 7081 and the diffusive optical element 711 may be swapped. That is, the diffusive optical element 711 may be disposed on the extension of the light exiting optical axis Lx1 of the light source apparatus 7, and the wavelength converter 7081 may be disposed so as to face the solid state light emitters 7021 so that the optical axis Lx7 of the wavelength converter 7081 coincides with the optical axis Lx8 of the entire solid-state light emitters 7021. In this case, the optical axis Lx8 of the entire solid state light emitters 7021 and the optical axis Lx7 of the wavelength converter 7081 are perpendicular to the optical axis Lx9 of the diffusive optical element 711.

In each of the above embodiments described above, the light source 702 includes the heat receiving member 7023, which is provided on the opposite side of the solid-state light emitters 7021 from the light emitting side thereof and receives the heat of the solid-state light emitters 7021, but not necessarily. The heat receiving member 7023 may be omitted. In this case, the heat pipes 7024 may be coupled to the support member 7020.

In each of the embodiments described above, the light source 702 includes the heat dissipating member 7025, which is coupled to the heat receiving member 7023 in a heat transferable manner, but not necessarily. The heat dissipating member 7025 may be omitted. The heat dissipating member 7025 may not be provided in the vicinity of the solid-state light emitters 7021, and the location of the heat dissipating member 7025 can be changed as appropriate.

In each of the embodiments described above, the light source 702 includes the heat pipes 7024, which couple the heat receiving member 7023 to the heat dissipating member 7025 in a heat transferable manner. The heat pipes 7024 may, however, be omitted. In this case, the heat dissipating member 7025 may be directly coupled to the heat receiving member 7023.

In each of the embodiments described above, the coolers 5A, 5C, and 5D each include the fans 54 and 55 provided in the space between the light source apparatus 7 and the projection optical apparatus 9 and located on the opposite side of the extension of the light exiting optical axis Lx1 of the light source apparatus 7 from the optical axis Lx2 of the entrance optical path 92, but not necessarily. The fans provided in the space described above may be omitted, or the number of fans provided in the space described above and the positions thereof are not limited to those described above.

In each of the above embodiments described above, the projection optical apparatus 9 is disposed at the center in the direction +Z in the exterior enclosure 2A, 2C, or 2D, the light source apparatus 7 and the image generation apparatus 8A or 8B are disposed in positions shifted in the direction −Z from the projection optical apparatus 9, and the controller 3 and the power supply 4 are disposed in positions shifted in the direction +Z from the projection optical apparatus 9, but not necessarily. The controller 3 and the power supply 4 may be disposed on the same side of the projection optical apparatus 9 as the side where the light source apparatus 7 and the image generation apparatus 8A or 8B are disposed.

In the first, third, and fourth embodiments described above, the light modulation apparatus 85 includes the three light modulators 85B, 85G, and 85R, but not necessarily. The number of light modulators provided in the light modulation apparatus is not limited to three and can be changed as appropriate.

The light modulators 85B, 85G, and 85R are each a transmissive liquid crystal panel having a light incident surface and a light exiting surface different from each other, but not necessarily. The light modulators may each be a reflective liquid crystal panel having a surface that serves both as the light incident surface and the light exiting surface. Further, a light modulator using any component other than a liquid-crystal-based component and capable of modulating an incident light flux to form an image according to image information, such as a device using micromirrors, for example, a DMD, may be employed.

In the second embodiment described above, the second reflective optical element 88 transmits in the direction +T the white light WL incident from the first reflective optical element 87 and reflects in the direction +S the image light incident from the image generator 89, but not necessarily. The second reflective optical element 88 may instead be configured to reflect in the direction −S the white light WL incident in the direction +T from the first reflective optical element 87 and transmit in the direction +S the image light incident from the image generator 89. In this case, the image generator 89 may be disposed in a position shifted in the direction −S from the second reflective optical element 88. Instead, the second reflective optical element 88 may be configured to reflect in the direction −Y or +Y the white light WL incident in the direction +T from the first reflective optical element 87 and reflect in the direction +S the image light incident from the image generator 89. In this case, the image generator 89 may be disposed in a position shifted in the direction −Y or +Y from the second reflective optical element 88.

In the embodiments described above, the projectors 1A, 1B, and 1C, which each project image light to display an image, are illustrated as the projection apparatus by way of example, but not necessarily. The projection apparatus according to the present disclosure may be any apparatus that projects light and is not necessarily limited to an apparatus that projects image light.

Overview of Present Disclosure

The present disclosure will be summarized below as additional remarks.

A projection apparatus according to an aspect of the present disclosure includes a light source apparatus that outputs light via an exit port, a first reflective optical element that reflects at least part of the light outputted by the light source apparatus, a second reflective optical element disposed in the optical path of the light reflected off the first reflective optical element, and a projection optical apparatus disposed in the optical axis of the light having exited out of the second reflective optical element. The projection optical apparatus has an entrance optical path that the light having exited out of the second reflective optical element enters, a deflection member that deflects the direction of the light having traveled along the entrance optical path, and a passage optical path along which the light having exited out of the deflection member travels. The extension of the light exiting optical axis of the light source apparatus does not coincide with the extension of the optical axis of the entrance optical path and intersects with the extension containing the optical axis of the passage optical path.

In the plan view of the projection apparatus viewed in the direction perpendicular to each of the direction in which the image light travels along the optical axis of the entrance optical path and the direction in which the image light travels along the optical axis of the passage optical path in the projection optical apparatus, the direction in which the image light travels along the optical axis of the passage optical path is a first direction, and the direction perpendicular to the first direction is a second direction.

The aforementioned arrangement of the light source apparatus can suppress at least one of protrusion of the light source apparatus, the first reflective optical element, and the second reflective optical element in the first direction beyond a first imaginary line that is parallel to the second direction and passes through an end of the projection optical apparatus that is the end shifted in the first direction and protrusion of the light source apparatus, the first reflective optical element, and the second reflective optical element in the direction opposite to the first direction beyond a second imaginary line that is parallel to the second direction and passes through an end of the projection optical apparatus that is the end shifted in the direction opposite to the first direction. An increase in the dimension of the projection apparatus in the first direction can therefore be suppressed, whereby the size of the projection apparatus can be reduced.

In the aspect described above, the deflection member may deflect at an acute angle the direction of the light having traveled along the entrance optical path.

The configuration described above can suppress an increase in the dimension of the projection apparatus in the first direction as compared with a case where the deflection member deflects the direction of the light having traveled along the entrance optical path in such a way that the traveling direction and the deflection direction form a right or obtuse angle, whereby the size of the projection apparatus can be reduced.

In the aspect described above, the extension of the light exiting optical axis of the light source apparatus may intersect with the optical axis of the passage optical path.

The configuration described above can suppress at least one of protrusion of the light source apparatus in the first direction beyond the first imaginary line and protrusion of the light source apparatus in the direction opposite to the first direction beyond the second imaginary line. The first and second reflective optical elements can thus be readily disposed between the first and second imaginary lines. The size of the projection apparatus in the first direction can therefore be reduced.

In the aspect described above, the extension of the light exiting optical axis of the light source apparatus may intersect with part of the extension containing the optical axis of the passage optical path, the extension extending in the direction opposite to the direction in which the light travels along the passage optical path.

The configuration described above can suppress protrusion of the light source apparatus, the first reflective optical element, and the second reflective optical element in the first direction beyond the first imaginary line. The size of the projection apparatus in the first direction can therefore be reduced.

In the aspect described above, the light exiting optical axis of the light source apparatus may be parallel to the optical axis of the entrance optical path.

The configuration described above allows optical parts provided between the light source apparatus and the projection optical apparatus, for example, the first and second reflective optical elements, to be readily disposed with respect to the light exiting optical axis of the light source apparatus and the optical axis of the entrance optical path.

Furthermore, the size of the projection apparatus in the first direction can be reduced as compared with a case where the extension of the light exiting optical axis of the light source apparatus inclines in the direction away from the entrance optical path with distance toward the projection optical apparatus.

In the aspect described above, the projection apparatus may include a first reflector that reflects first color light having passed through the first reflective optical element, a first light modulator that modulates the first color light reflected off the first reflector, a second light modulator that modulates second color light separated by the second reflective optical element out of the light reflected off the first reflective optical element, a second reflector that reflects third color light separated by the second optical reflective element out of the light reflected off the first optical reflective element, a third reflector that reflects the third color light reflected off the second reflector, a third light modulator that modulates the third color light reflected off the third reflector, and a color combiner that outputs combined light that is the combination of the light modulated by the first light modulator, the light modulated by the second light modulator, and the light modulated by the third light modulator. The light source apparatus may output white light. The first reflective optical element may be a first color separator that transmits the first color light contained in the white light outputted by the light source apparatus and reflects the second color light and the third color light contained in the white light. The second reflective optical element may be a second color separator that reflects the second color light and transmits the third color light out of the second color light and the third color light reflected off the first color separator. The optical axis of the second color light reflected off the second reflective optical element may coincide with the optical axis of the combined light having exited out of the color combiner.

The configuration described above can suppress protrusion of the first light modulator, the second light modulator, the third light modulator, and the color combiner in the direction opposite to the first direction beyond the second imaginary line. The size of the projection apparatus in the first direction can therefore be reduced.

In the aspect described above, the extension of the light exiting optical axis of the light source apparatus may coincide with the optical axis between the first reflective optical element and the first reflector.

The configuration described above allows the first reflective optical element and the first reflector to be readily disposed on the extension of the light exiting optical axis of the light source apparatus.

The configuration described above further allows suppression of protrusion of optical parts, such as the light source apparatus, in the first direction beyond the first imaginary line and protrusion of the optical parts, such as the light source apparatus, in the direction opposite to the first direction beyond the second imaginary line. The size of the projection apparatus in the first direction can therefore be reduced.

In the aspect described above, the projection apparatus may include an image generator that generates the image light from the light having passed through the second reflective optical element and outputs the image light in the direction opposite to the direction in which the light is incident from the second reflective optical element, and the second reflective optical element may transmit the light incident from the first reflective optical element to cause the light to enter the image generator and reflect the image light incident from the image generator to cause the image light to exit toward the projection optical apparatus.

According to the configuration described above, the optical axis of the image light from the second reflective optical element, which causes the image light incident from the image generator to exit toward the projection optical apparatus, coincides with the light incident optical axis of the projection optical apparatus. The image generator can thus be readily disposed between the first imaginary line and the second imaginary line. An increase in the dimension of the projection apparatus in the first direction can therefore be suppressed as compared with a case where the image generator is disposed in a position shifted in the direction opposite to the first direction from the second imaginary line, whereby the size of the projection apparatus can be reduced.

In the aspect described above, the light source apparatus may include a solid-state light emitter, a wavelength converter that outputs converted light having a wavelength longer than the wavelength of a first portion of the light emitted by the solid-state light emitter, a diffusive optical element that diffuses a second portion of the light emitted by the solid-state light emitter, and a light combiner that combines the converted light outputted by the wavelength converter with the second portion of the light outputted by the diffusive optical element. The light exiting optical axis of the light source apparatus may coincide with the optical axis of one of the solid-state light emitter, the wavelength converter, and the diffusive optical element. Two of the solid-state light emitter, the wavelength converter, and the diffusive optical element that have optical axes that do not coincide with the light exiting optical axis of the light source apparatus may face each other. The optical axes of the two optical elements may be perpendicular to the light exiting optical axis of the light source apparatus.

According to the configuration described above, the light source apparatus includes the solid-state light emitter, the wavelength converter, and the diffusive optical element. The configuration described above allows reduction in the dimensions of the light source apparatus with the amount of light outputted therefrom increased as compared with a light source apparatus including a light source lamp, such as an ultrahigh-pressure mercury lamp.

Furthermore, the aforementioned arrangement of the solid-state light emitter, the wavelength converter, and the diffusive optical element can suppress protrusion of the light source apparatus in the first direction beyond the first imaginary line and protrusion of the light source apparatus in the direction opposite to the first direction beyond the second imaginary line. The size of the projection apparatus in the first direction can therefore be reduced.

In the aspect described above, the light source apparatus may include a heat receiving member that is provided on the opposite side of the solid-state light emitter from the light emitting side thereof and receives heat of the solid-state light emitter.

The configuration described above allows an increase in the heat dissipation area via which the heat generated by the solid-state light emitter is dissipated. The heat dissipation efficiency in accordance with which the heat generated by the solid-state light emitter is dissipated can therefore be increased.

In the aspect described above, the light source apparatus may further include a heat dissipating member coupled to the heat receiving member in a heat transferable manner.

The configuration described above allows a further increase in the heat dissipation area via which the heat generated by the solid-state light emitter is dissipated. The heat dissipation efficiency in accordance with which the heat generated by the solid-state light emitter is dissipated can therefore be further increased.

In the aspect described above, the light source apparatus may further include a heat pipe that transfers the heat transferred from the heat receiving member to the heat dissipating member.

According to the configuration described above, the heat of the heat receiving member can be efficiently transferred to the heat dissipating member, whereby the heat dissipation efficiency in accordance with which the heat generated by the solid light emitter is dissipated can be further increased. Even when the heat receiving member and the heat dissipating member are disposed so as to be apart from each other, the heat pipe can efficiently transfer the heat from the heat receiving member to the heat dissipating member. The flexibility of the layout of the heat dissipating member can therefore be increased.

In the aspect described above, the deflection member may deflect at an acute angle the direction of the light having traveled along the entrance optical path, and a straight line that is perpendicular to the passage optical path and passes through the position where the optical axis of the solid-state light emitter, the optical axis of the wavelength converter, and the optical axis of the diffusive optical element intersect with one another may be shifted in the direction in which the light travels along the passage optical path from the position where the deflection member deflects the light having traveled along the entrance optical path.

The configuration described above allows the light source apparatus to be readily disposed between the first imaginary line and the second imaginary line. The arrangement described above can suppress protrusion of the light source apparatus in the first direction beyond the first imaginary line and protrusion of the light source apparatus in the direction opposite to the first direction beyond the second imaginary line. Furthermore, the optical parts that guide the light outputted from the light source apparatus to the projection optical apparatus can be readily disposed between the first imaginary line and the second imaginary line. The size of the projection apparatus in the first direction can therefore be reduced.

In the aspect described above, the projection apparatus may include a fan provided in the space between the light source apparatus and the projection optical apparatus and located on the opposite side of the extension of the light exiting optical axis of the light source apparatus from the optical axis of the entrance optical path.

According to the configuration described above, the fan is disposed in a position shifted in the first direction described above from the extension of the light exiting optical axis of the light source apparatus. The fan can therefore be disposed in a region that is likely to form a dead space in the projection apparatus. Therefore, since the parts can be disposed in a packed manner in the projection apparatus, the dimensions of the projection apparatus can be reduced, and the size of the projection apparatus can therefore be reduced.

What is claimed is:

1. A projection apparatus comprising:
a light source apparatus that outputs light via an exit port;
a first reflective optical element that reflects at least part of the light outputted by the light source apparatus;
a second reflective optical element disposed in an optical path of the light reflected off the first reflective optical element; and
a projection optical apparatus disposed in an optical axis of light that exits out of the second reflective optical element,
wherein the projection optical apparatus has
an entrance optical path that the light that exits out of the second reflective optical element enters,
a deflection member that deflects a direction of the light traveling along the entrance optical path, and
a passage optical path along which the light that exits out of the deflection member travels, and
an extension of a light exiting optical axis of the light source apparatus does not coincide with an extension of an optical axis of the entrance optical path and intersects with an extension containing an optical axis of the passage optical path,
wherein the deflection member deflects at an acute angle the direction of the light traveling along the entrance optical path.

2. The projection apparatus according to claim 1, wherein the extension of the light exiting optical axis of the light source apparatus intersects with the optical axis of the passage optical path.

3. The projection apparatus according to claim 1, wherein the extension of the light exiting optical axis of the light source apparatus intersects with part of the extension containing the optical axis of the passage optical path, an extension extending in a direction opposite to a direction in which the light travels along the passage optical path.

4. The projection apparatus according to claim 1, wherein the light exiting optical axis of the light source apparatus is parallel to the optical axis of the entrance optical path.

5. The projection apparatus according to claim 1, further comprising:
a first reflector that reflects first color light passing through the first reflective optical element;
a first light modulator that modulates the first color light reflected off the first reflector;
a second light modulator that modulates second color light separated by the second reflective optical element out of the light reflected off the first reflective optical element;
a second reflector that reflects third color light separated by the second optical reflective element out of the light reflected off the first optical reflective element;
a third reflector that reflects the third color light reflected off the second reflector;
a third light modulator that modulates the third color light reflected off the third reflector; and
a color combiner that outputs combined light that is a combination of the light modulated by the first light modulator, the light modulated by the second light modulator, and the light modulated by the third light modulator,
wherein the light source apparatus outputs white light,
the first reflective optical element is a first color separator that transmits the first color light contained in the white light outputted by the light source apparatus and reflects the second color light and the third color light contained in the white light,
the second reflective optical element is a second color separator that reflects the second color light and transmits the third color light out of the second color light and the third color light reflected off the first color separator, and
an optical axis of the second color light reflected off the second reflective optical element coincides with an optical axis of the combined light that exits out of the color combiner.

6. The projection apparatus according to claim 5, wherein the extension of the light exiting optical axis of the light source apparatus coincides with an optical axis between the first reflective optical element and the first reflector.

7. The projection apparatus according to claim 1, wherein the light source apparatus includes
a solid-state light emitter,
a wavelength converter that outputs converted light having a wavelength longer than a wavelength of a first portion of light emitted by the solid-state light emitter,
a diffusive optical element that diffuses a second portion of the light emitted by the solid-state light emitter, and
a light combiner that combines the converted light outputted by the wavelength converter with the second portion of the light outputted by the diffusive optical element,
the light exiting optical axis of the light source apparatus coincides with an optical axis of one of the solid-state light emitter, the wavelength converter, and the diffusive optical element,
two of the solid-state light emitter, the wavelength converter, and the diffusive optical element that have optical axes that do not coincide with the light exiting optical axis of the light source apparatus face each other, and the optical axes of the two optical elements are perpendicular to the light exiting optical axis of the light source apparatus.

8. The projection apparatus according to claim 7, further comprising a heat receiving member that is provided on an opposite side of the solid-state light emitter from a light emitting side thereof and receives heat of the solid-state light emitter.

9. The projection apparatus according to claim 8, further comprising a heat dissipating member coupled to the heat receiving member in a heat transferable manner.

10. The projection apparatus according to claim 9, further comprising a heat pipe that transfers the heat transferred from the heat receiving member to the heat dissipating member.

11. The projection apparatus according to claim 7, wherein the deflection member deflects at an acute angle the direction of the light traveling along the entrance optical path, and a straight line that is perpendicular to the passage optical path and passes through a position where an optical axis of the solid-state light emitter, an optical axis of the wavelength converter, and an optical axis of the diffusive optical element intersect with one another is shifted in a direction in which the light travels along the passage optical path from a position where the deflection member deflects the light traveling along the entrance optical path.

12. A projection apparatus comprising:
a light source apparatus that outputs light via an exit port;
a first reflective optical element that reflects at least part of the light outputted by the light source apparatus;
a second reflective optical element disposed in an optical path of the light reflected off the first reflective optical element; and
a projection optical apparatus disposed in an optical axis of light that exits out of the second reflective optical element,
wherein the projection optical apparatus has
an entrance optical path that the light that exits out of the second reflective optical element enters,
a deflection member that deflects a direction of the light traveling along the entrance optical path, and
a passage optical path along which the light that exits out of the deflection member travels, and
an extension of a light exiting optical axis of the light source apparatus does not coincide with an extension of an optical axis of the entrance optical path and intersects with an extension containing an optical axis of the passage optical path,
the projection apparatus further comprising an image generator that generates image light from the light passing through the second reflective optical element and outputs the image light in a direction opposite to a direction in which the light is incident from the second reflective optical element,
wherein the second reflective optical element transmits the light incident from the first reflective optical element to cause the light to enter the image generator and reflects the image light incident from the image generator to cause the image light to exit toward the projection optical apparatus.

13. A projection apparatus comprising:
a light source apparatus that outputs light via an exit port;
a first reflective optical element that reflects at least part of the light outputted by the light source apparatus;
a second reflective optical element disposed in an optical path of the light reflected off the first reflective optical element; and
a projection optical apparatus disposed in an optical axis of light that exits out of the second reflective optical element,
wherein the projection optical apparatus has
an entrance optical path that the light that exits out of the second reflective optical element enters,
a deflection member that deflects a direction of the light traveling along the entrance optical path, and
a passage optical path along which the light that exits out of the deflection member travels, and
an extension of a light exiting optical axis of the light source apparatus does not coincide with an extension of an optical axis of the entrance optical path and intersects with an extension containing an optical axis of the passage optical path,
the projection apparatus further comprising a fan provided in a space between the light source apparatus and the projection optical apparatus and located on an opposite side of the extension of the light exiting optical axis of the light source apparatus from the optical axis of the entrance optical path.

14. A projection apparatus comprising:
an exterior enclosure;
a light source apparatus that outputs light via an exit port;
a first reflective optical element that reflects at least part of the light outputted by the light source apparatus;
a second reflective optical element disposed in an optical path of the light reflected off the first reflective optical element;
a projection optical apparatus disposed in an optical axis of light that exits out of the second reflective optical element; and
a first fan,
wherein the projection optical apparatus has
an entrance optical path that the light that exits out of the second reflective optical element enters,
a deflection member that deflects a direction of the light traveling along the entrance optical path, and
a passage optical path along which the light that exits out of the deflection member travels, and
an extension of a light exiting optical axis of the light source apparatus does not coincide with an extension of an optical axis of the entrance optical path and intersects with an extension containing an optical axis of the passage optical path,
the exterior enclosure has a first inner surface facing a direction of travel of the light deflected by the deflection member and a second inner surface located on an opposite side of the light source apparatus from the projection optical apparatus, and
the first fan provided in a space among the first surface, the second surface, the light source apparatus and the projection optical apparatus and located on an opposite side of the extension of the light exiting optical axis of the light source apparatus from the optical axis of the entrance optical path.

15. The projection apparatus according to claim 14, wherein the light source apparatus has a heat dissipating member, and
the first fan cools the heat dissipating member.

16. The projection apparatus according to claim 15,
further comprising an image generator that generates image light from the light passing through the second reflective optical element, and
a second fan provided in a space among the first surface of the exterior enclosure, the light source apparatus and the projection optical apparatus and located on an opposite side of the extension of the light exiting optical axis of the light source apparatus from the optical axis of the entrance optical path,
wherein the second fan cools the image generator.

17. The projection apparatus according to claim 14,
further comprising an image generator that generates image light from the light passing through the second reflective optical element,
wherein the first fan cools the image generator.

18. The projection apparatus according to claim 17,
further comprising a second fan provided in a space among the first surface of the exterior enclosure, the light source apparatus and the projection optical apparatus and located on an opposite side of the extension of the light exiting optical axis of the light source apparatus from the optical axis of the entrance optical path,
wherein the light source apparatus has a heat dissipating member, and
the second fan cools the heat dissipating member.

* * * * *